(12) United States Patent
Milne et al.

(10) Patent No.: US 12,499,080 B2
(45) Date of Patent: Dec. 16, 2025

(54) METHOD AND APPARATUS FOR SUPPORTING DISTRIBUTED GRAPHICS AND COMPUTE ENGINES AND SYNCHRONIZATION IN MULTI-DIELET PARALLEL PROCESSOR ARCHITECTURES

(71) Applicant: NVIDIA Corporation, Santa Clara, CA (US)

(72) Inventors: Timothy Ian Milne, Santa Clara, CA (US); Vaishali Kulkarni, Santa Clara, CA (US); Debajit Bhattacharya, Santa Clara, CA (US); Ashish Kumar Maurya, Santa Clara, CA (US); Tong Tong, Santa Clara, CA (US); Vadiraj Alias Abhay Ayachit, Santa Clara, CA (US); Chase Caldwell Wheeler, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/606,924

(22) Filed: Mar. 15, 2024

(65) Prior Publication Data
US 2025/0291764 A1 Sep. 18, 2025

(51) Int. Cl.
*G06F 15/80* (2006.01)

(52) U.S. Cl.
CPC .................... *G06F 15/80* (2013.01)

(58) Field of Classification Search
None
See application file for complete search history.

(56) References Cited

U.S. PATENT DOCUMENTS

| | | | |
|---|---|---|---|
| 10,713,095 B2 * | 7/2020 | Yoo | G06F 9/5044 |
| 12,094,048 B2 * | 9/2024 | Surti | G06T 1/20 |
| 2014/0281380 A1 * | 9/2014 | Sodhi | G06F 9/30123 712/30 |
| 2018/0095892 A1 * | 4/2018 | Wilkinson | G06F 12/145 |
| 2023/0034539 A1 * | 2/2023 | Dong | G06F 9/4812 |
| 2023/0325576 A1 * | 10/2023 | Kamdar | G06F 30/392 365/230.01 |
| 2024/0419447 A1 * | 12/2024 | Chaudhari | G06T 1/20 |
| 2025/0004536 A1 * | 1/2025 | Purandare | G06F 1/3206 |
| 2025/0155500 A1 * | 5/2025 | Pelt | G01R 31/2834 |

OTHER PUBLICATIONS

Zhang, H et al., SEECHIP: A Scalable and Energy-Efficient Chiplet-based GPU Architecture Using Photonic links), 2023, ACM pp. 566-575. (Year: 2023).*
Zhang, Jinming. et a., INDM: Chiplet-Based Interconnect Network and Dataflow Mapping for DNN Accelerators, 2023, IEEE, pp. 1107-1120. (Year: 2023).*
U.S. Appl. No. 17/691,690, filed Mar. 10, 2022, Prabhakar.
U.S. Appl. No. 17/691,621, filed Mar. 10, 2022, Palmer.

* cited by examiner

*Primary Examiner* — Eric Coleman
(74) *Attorney, Agent, or Firm* — Nixon & Vanderhye P.C.

(57) ABSTRACT

This disclosure describes supporting distributed graphics and compute engines in a multi-dielet processor, such as, for example, a multi-dielet graphics processing unit (GPU), architectures and synchronization in such architectures. Each multi-dielet processor includes a hardware-implemented remapping capability and/or a hardware-implemented memory barrier capability.

20 Claims, 16 Drawing Sheets

Example General Processing Cluster

METHOD AND APPARATUS FOR SUPPORTING DISTRIBUTED GRAPHICS AND COMPUTE ENGINES AND SYNCHRONIZATION IN MULTI-DIELET PARALLEL PROCESSOR ARCHITECTURES

CROSS REFERENCE TO RELATED APPLICATION

This application is related to concurrently filed U.S. application Ser. No. 18/606,960 titled "Supporting Distributed Graphics and Compute Engines and Synchronization in Multi-Dielet Parallel Processor Architectures—Memory Barriers."

FIELD

This technology generally relates to multi-dielet processing systems such as multi-dielet graphics processing units (GPUs). More particularly, the technology herein relates to distributed graphics and compute engines and synchronization in such processing systems.

BACKGROUND

The demand for processors that have extensive parallel processing capabilities, such as, for example, graphics processing units (GPU), continues to increase. The processing demands on such processors are also growing rapidly in complexity and magnitude of workloads, and rate of throughput.

The demands for a GPU to excel at workloads of rapidly growing complexity, magnitude and throughput drive a push to pack an ever-increasing number of components on the GPU semiconductor die—generally a thumbnail sized square of flat semiconductor material such as silicon cut from a wafer, on which circuitry is fabricated. The more components that are packed on a die, the more functionality that can be provided by an integrated circuit chip package including the die. Therefore, chip designers have been striving to pack an ever increasing number and variety of components onto each physical die.

There are physical limitations as to how many components can be packed onto a single die. For example, packing more transistors generates more heat that could damage the chip unless cooling is managed appropriately. More components, often smaller components, on a single die can also make interconnects difficult to implement and can also cause signal issues and the like on the interconnects. Additionally, Moore's law notwithstanding, some components may have a minimum physical size beyond which they cannot easily be further miniaturized.

Therefore, the push to pack more components on a single die may encounter difficult to overcome limits on the number of components, types of components, or the physical size of the processors, while the workload demands continue to grow. To address the growing workload demands, in addition to packing higher numbers and types of components on a single die, other manners of expanding the processing capacities and capabilities of processors such as GPUs may be explored.

DETAILED DESCRIPTION OF EXAMPLE NON-LIMITING EMBODIMENTS

Figure 1:
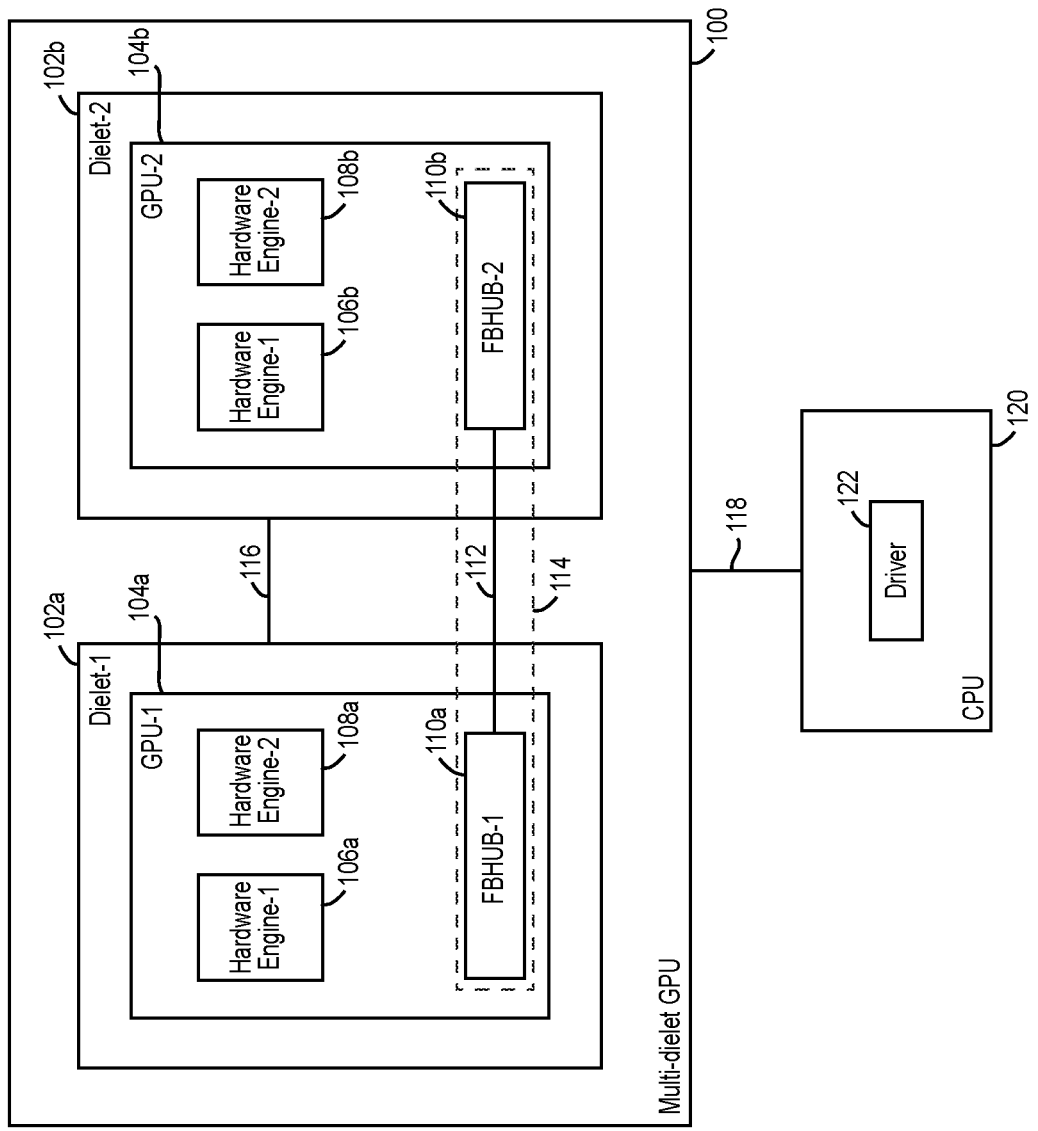
FIG. 1 illustrates a multi-dielet GPU according to some embodiments of the present disclosure.

With the slowdown of CMOS process scaling, the silicon die is hitting the lithographic reticle limit. On the other hand, packaging technologies have advanced to allow integration of multiple dies ("dielets"/"chiplets") to achieve higher packing density. In view of these factors, it has been proposed to interconnect multiple physical dielets together to form a larger and more complex processing system such as a GPU. Such larger processing systems are referred to herein as "multi-dielet processing systems". Designing a processing system beyond the bounds of a single fabricated die, as is the case with a multi-dielet processing system, provides a new path to scalability and removes some previously existing physical limitations.

For purposes of description, this disclosure references a multi-dielet GPU having two independently fabricated dielets, where each dielet contains one or more streaming multiprocessors (SMs), specific and general purpose hardware engines, and associated routing components used for application performance on behalf of CPU or GPU initiated processes. In some embodiments, the GPUs on the dielets may be identical. In such cases, the multi-dielet GPU may have duplicate components between the two dielets. Depending on the application, such duplicate components may be utilized or may be redundant. In some embodiments, the GPUs on the dielets may not be identical, and some GPUs may have different collections of hardware units. It is necessary that example embodiments accommodate different scenarios of combining multiple GPUs with different capabilities.

In the case of standalone (i.e. single die) GPUs, the software, such as, for example, GPU driver software running on the CPU, generally sees a single GPU with which it interacts to schedule tasks etc. on the GPU. The frontend to the GPU's memory system may, at least in some embodiments, be a framebuffer hub (FBHUB). Thus, one of the issues with the multi-dielet GPU is to provide for the software and various hardware entities (e.g., compute and graphics engines on each of the dielets) that access the multi-dielet GPU's memory system to continue seeing it as one GPU, in the same or similar manner as how it viewed the single die GPU, when each dielet in the multi-dielet GPU has its own FBHUB. The FBHUB is a hardware component of the GPU and can be considered the gateway to the GPU memory system in the GPU. In order to schedule and orchestrate work on the computer cores etc., there are many GPU components that interoperate (e.g., many Direct Memory Access (DMA) targets etc.). These hardware units access the memory system via the FBHUB. The FBHUB is also a synchronization point for any entity in the GPU that requires access to the memory system. More particularly, the FBHUB coordinates synchronization between other hardware components on the GPU that access memory, and other GPU endpoints like memory partition units (MPUs) and high speed hub (HSHUB), for example, that interface with connected CPU or GPUs.

As such larger GPUs are formed, however, it is often necessary, or efficient, to shield the software from having to have knowledge of the physical layout of such a larger GPU. Such shielding may be necessary, for example, to ensure that the multi-dielet GPU can be interoperable in many usage scenarios without extensive modifications to customize the software stack for each scenario. Such shielding of the software from having knowledge of the detailed organization of the multi-dielet GPU enables, at least in some instances, the retrofitting of different multi-dielet GPUs to existing software (e.g., GPU driver software). The shielding can also "future-proof" multi-dielet designs by ensuring that the software can operate with such multi-dielet GPUs irrespective of the specific design (e.g., number of dielets, types and number of hardware engines on each dielet, etc.). The approach in embodiments in this disclosure is seamless from a system level view and avoids burdening the application programmer with having to handle how multiple dielets are stitched together to deliver compute power of a single large GPU.

Example embodiments provide for shielding the GPU software from many of the details of the hardware organization of the multi-dielet GPU. One important characteristic for multi-dielet GPU architectures is to present a monolithic view (e.g., a unified view) of the GPU to the software being deployed on it and promote reusability and portability across many variations of multi-dielet GPU. Ideally, software should be able to understand the hardware as if it were a single GPU regardless of how many dielets exist and what the individual makeup of these dielets are. For example, if the same DMA engine existed in multiple dielets and all those DMA engines are expected to operate as separate independent engines, the software must be able to uniquely identify each of these engines and their software-exposed engine identifiers. Events such as faults, interrupts, page table binds, and others depend on this uniqueness. Maintaining a unified view of GPU to the software stack running on top may be key to scaling GPU hardware, with dielet technology, beyond the reticle limit as well as beyond the end of Moore's law.

Some embodiments may be thought of as addressing the problem of how, when the same GPU is duplicated multiple times to form a single multi-die GPU or any number of asymmetric dielets are to be viewed from software as a single hardware component (single GPU), to uniquify all the components (e.g., hardware units) in the combined GPU. This is different from the scenario of where a CPU, GPU and other hardware components on respective dies are combined.

Features described in this disclosure are designed to facilitate scaling many aspects of the GPU design across multiple dielets, including but not limited to syspipes, MiGs, micro-GPUs, or other partial GPU features, and multi-dielet distributed GPCs and memory endpoints.

This monolithic view provided by example embodiments extends to hardware units in the respective dies as well. When referencing "hardware units" herein, this includes but is not limited to those used in graphics and compute applications, video encoding or decoding, units in GPC and SYS clusters, and any unit with DMA capabilities. Hardware units have expectations for various operations in the memory subsystem to be "system level aware". For example, when a DMA engine requires to ensure memory writes are visible at a system wide scope, this scope should include all memory locations local to the dielet containing this DMA engine as well as any other memory locations on connected dielets in the GPU. Without hardware implementations for this handling, software would need explicit knowledge of dielet specific hardware unit and memory locations as well as the ability to manually synchronize parallel operations, resulting in complex software and performance degradations. In this disclosure the terms "hardware unit" and "hardware engine" may be used interchangeably.

Embodiments of the present disclosure focus on hardware mechanisms to present multi-dielet architectures, in which multiple dielets have at least one GPU, as a monolithic view (e.g., as a single cohesive GPU) to software. This approach differs from software-based solutions that must provide the software with information of dielet structure, such as information of what hardware engines are on each die and how each hardware engine is addressed. This approach also requires fewer hardware units to be aware of dielet structure than other potential solutions and also enables more hardware units in the respective GPUs to be agnostic to the specifics of the multi-dielet GPU's structure, promoting reuse and scalability.

Embodiments of this disclosure provide multiple hardware features on each of several dielets of a multi-dielet GPU to create a monolithic view of the multi-dielet GPU for both software and hardware units. These hardware features, implemented as one or more hardware circuits, allow for hardware driven synchronization across the multiple dielets and limit any requirements for exposure of these complex architectures to software applications. The multiple hardware features of the solution include an address remapping feature and a synchronization feature.

A hardware engine remapper in some embodiments is configured to provide a unique or distinctive engine ID per hardware unit that is intended to be operable in more than one dielet for uniquifying or otherwise distinguishing page table binds, address translations, security checks, fault handling, etc. In some embodiments, each engine request that uses non-BAR (non base address register) engine IDs include a flag to instruct the GPU, or more specifically, an FBHUB of the GPU, to convert the local dielet relative engine ID ("local engine ID") included in the request by the source hardware engine into a globally unique engine ID ("global engine ID") equivalent.

Each individual GPU, or more specifically a frame buffer hub (FBHUB) of that GPU, may calculate an offset based on a dielet-identifying fuse signal and may replace the relative engine ID provided by the source hardware engine with an equivalent global engine ID determined based on the calculated offset. When responding or sending an acknowledgment to a source hardware engine's request, FBHUB may reverse map the globally engine ID to the local engine ID equivalent.

In embodiments of the present disclosure, a globally unique identifier (e.g., based on the dielet-identifying fuse signal) is determined for each FBHUB instance to facilitate request and message routing between hardware units in different dielets of the multi-dielet GPU. Each FBHUB instance is represented by a unique node ID such that the FBHUB is aware if certain traffic is intended to be consumed by itself (e.g., by one or more hardware units on its dielet) or forwarded to remote FBHUB instances located on different dielets.

The FBHUB provides a channel for some units on its dielet to communicate directly with other units on different dielets. Messages originated on a hardware engine on the FBHUB's dielet and directed to another hardware engine in the multi-dielet GPU are either sent to destinations within the same dielet, or forwarded to a remote FBHUB where they can be processed and sent to the destination hardware engine in the remote dielet. This channel essentially removes the physical dielet from the equation and allows communication among hardware units as if they were all on a single die. When communications are forwarded to remote FBHUB instances, the destination instances are also capable of and responsible for sending an ack (an acknowledgement indication) back to the forwarding FBHUB instance. This communication channel and acknowledgement mechanism facilitates memory barrier operations (membars) across all dielets.

Some embodiments of the present disclosure include a hardware mechanism for deadlock free, independent, software-triggered membars of configurable scope. For example, software is enabled to write an FBHUB register that is configured as a membar trigger. When the register is written to, the FBHUB executes a membar with scope determined by the register write, without interrupting pending or in progress hardware originated membars. The register written to trigger a membar may be a privileged register (e.g., pri register). The FBHUB can acknowledge the software's membar request by writing a readable status register and clearing the trigger.

Some embodiments may also include a high priority direct interface connecting FBHUBs across dielets to facilitate system level membar synchronization. The high priority direct interface bypasses high traffic crossbar interfaces, such as the crossbar interconnecting the individual GPUs in the multi-dielet GPU, to reduce latency in FBHUB-to-FBHUB communication and ultimately the membar operation itself.

In relation to the hardware mechanism for membars, the FBHUB may also implement a remote flush request-ack handshake over the direct interface for pushing remote die traffic to system level points of coherency. An independently operable finite state machine (FSM) is implemented for decoupling the input/output (I/O) flush phase of membar handling. The FBHUB design may consist of multiple sequential but independently executable FSMs to segment the membar handling into scope-specific components, improving coalescing and minimizing the time cost of membars.

With this segmented FSM design, the I/O flush phase of membar-based synchronization can be initiated by a direct memory access (DMA) engine on the local dielet, by a local dielet GPC originated membar, or by an FBHUB located on a remote dielet executing its own I/O flush.

Each FBHUB instance can simultaneously issue a remote I/O flush to a remote FBHUB and accept and process a remote I/O flush request from a remote FBHUB. This simultaneous characteristic allows multi-dielet scaling without introducing interference between the dielets and avoids mutual deadlock.

FIG. 1 illustrates a multi-dielet GPU 100, according to some embodiments of the present disclosure. The multi-dielet GPU 100 comprises two dielets—dielet-1 102*a* and dielet-2 102*b*. Each dielet includes a GPU, with dielet-1 102*a* having GPU-1 104*a* and dielet2 102*b* having GPU-2 104*b*. The dielets may be interconnected by one or more high speed links 116. In some embodiments, the high speed link is a chip-to-chip high bandwidth interface (CTCHBI), an NVLink interface, or other high bandwidth interface. Each multi-dielet GPU may have 2 or more dielets that each have one or more GPUs. However, embodiments are not limited in the number of dielets included in the multi-dielet GPU, or the number of GPUs on each dielet. The multi-dielet GPU may additionally have any number of dielets that have no GPUs.

Each GPU includes a plurality of hardware engines. For example, each dielet has its own one or more streaming multiprocessors (SMs) and other hardware engines that perform processing to support processing performed on the SMs. In the illustrated embodiment, GPU-1 includes hardware engine-1 106*a* and hardware engine-2 108*a*, and GPU-2 includes hardware engine-1 106*b* and hardware engine-2 108*b*. The hardware engines may include compute units, graphics units, encoding/decoding units, encryption/decryption units, etc. Embodiments are not limited to any particular number of hardware engines or to any type(s) of hardware engines on each GPU.

Each GPU also includes a frame buffer hub (FBHUB). In the illustrated embodiment, GPU-1 104*a* has FBHUB-1

110a and GPU-2 104b includes FBHUB-2 110b. The FBHUBs on the individual dielets are interconnected with the high speed connection 112. In some embodiments, circuitry 114 comprising at least parts of each FBHUB in the multi-dielet GPU 100 provides a capability of a monolithic view of the multi-dielet GPU 100 so that the external entities, such as, for example, driver 122 software executing on the CPU 120 that communicates with the multi-dielet GPU 100 over an interface 118 (e.g., a PCI interface, an NVLink interface, etc.) can treat the multi-dielet GPU 100 as a monolithic GPU. That is, the monolithic view enabled by circuitry 114 allows software, such as, for example, driver software 122, to be agnostic with respect to the specific structure of the multi-dielet GPU 100.

Figure 2:
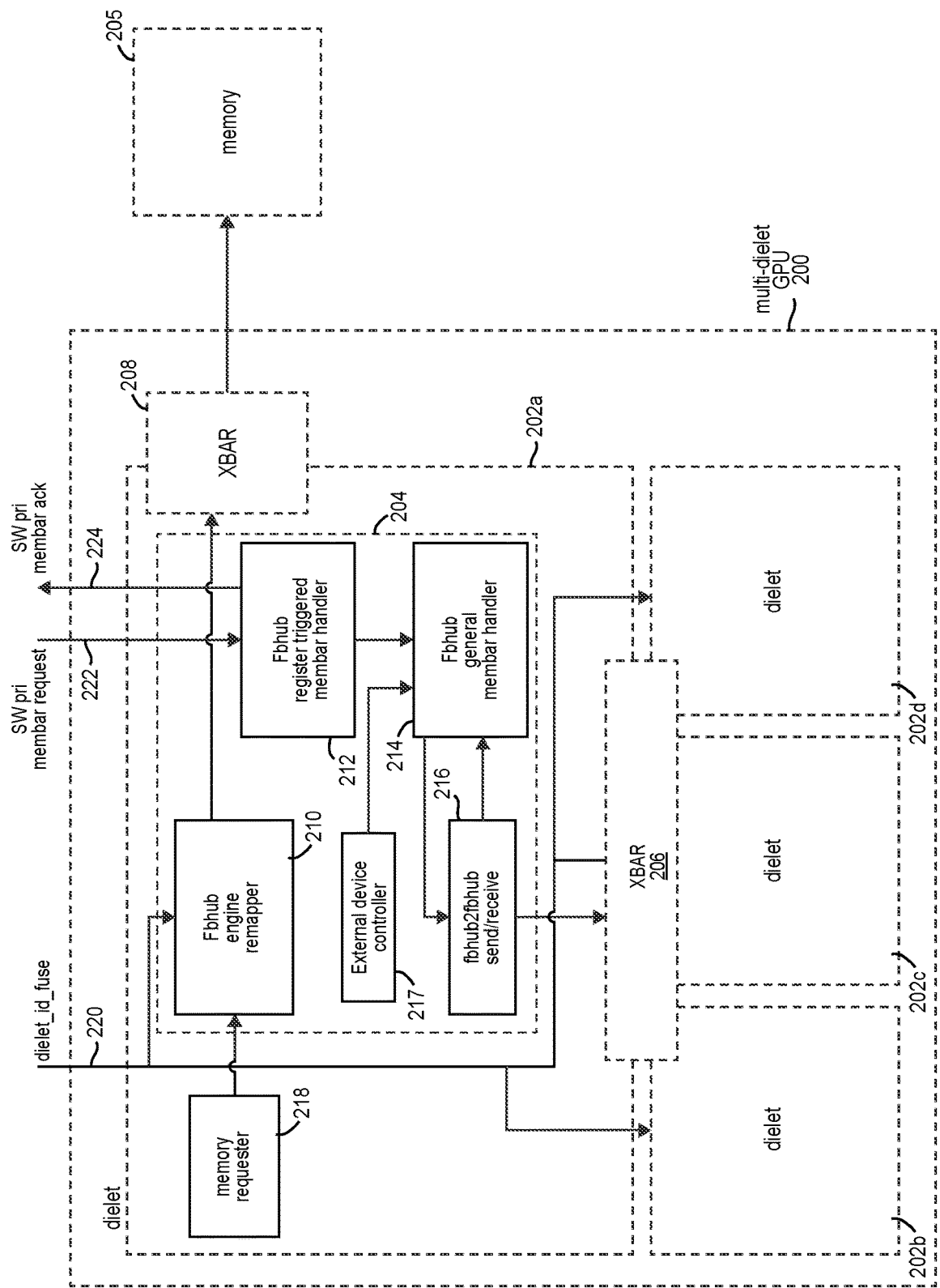
FIG. 2 illustrates another multi-dielet GPU according to some embodiments of the present disclosure.

FIG. 2 illustrates another multi-dielet GPU 200 according to some embodiments. FIG. 2 also schematically illustrates hardware components 204 that may be included on each dielet and that are configured to provide capabilities described in this disclosure.

Multi-dielet GPU 200 comprises four dielets 202a, 202b, 202c and 202d. In some embodiments, crossbar 206 interconnects the dielets 202a, 202b, 202c and 202d. At least in some embodiments, each dielet may have another crossbar 208 connecting the dielet to memory 205.

The FBHUB 204 of dielet 202a may include a hardware engine remapper 210, a register triggered membar handler 212, a general membar handler 214, a FBHUB-to-FBHUB sender/receiver 216, and an external device controller 217. Similarly, each dielet 202b-202d includes a FBHUB that may each include a corresponding hardware engine remapper, a register triggered membar handler, a general membar handler, a FBHUB-to-FBHUB sender/receiver, and an external device controller, that are configured to operate in the same or similar manner to the corresponding component described in relation to dielet 202a.

The engine remapper 210 on dielet 202a may be configured to map the local engine IDs of hardware engines on dielet 202a to respectively corresponding globally unique engine IDs. In some embodiments, this mapping is performed based on an offset that is determined by an identifier assigned to dielet 202a, where the assigned identifier is unique within the multi-dielet GPU 200.

The engine remapper 210 may also be configured to perform reverse mapping of globally unique engine IDs (global engine IDs) to corresponding local hardware engine IDs (local engine IDs). That is, the remapper 210 on dielet 202a is configured to perform reverse mapping of global engine IDs of hardware engines on dielet 202a to their corresponding local engine IDs.

The remapper 210 may, for example, map memory requests sent by any memory requester 218 located in the same dielet, or a memory requester external to that dielet. Memory requester 218 may include hardware engines on the dielet 202a.

A fuse 220 in each of the dielets 202a-202d is set to specify the unique identifier assigned to the dielet within the multi-dielet GPU 200. As noted above, the unique identifier of a dielet is used by the remapper 210 in performing the mapping and remapping between local engine IDs of hardware units and their corresponding global engine IDs.

For example, each of the four dielets in the multi-dielet GPU 200 may be assigned a unique number between 0-3 (e.g., if a multi-dielet GPU has n dielets, each individual dielet may be assigned a unique number between 0 and n−1). Given a configured offset size, the corresponding global engine ID of local hardware engine ID p on the $i^{th}$ dielet in a multi-dielet GPU in which each dielet is identified by a different number between 0 to n−1 may be determined as p+(offset size)×i.

The register triggered membar handler 212 and the general membar handler 214 on dielet 202a enable the FBHUB 204 to handle membar operations on dielet 202a. Membar requests received by FBHUB 204 can be initiated by hardware engines local on dielet 202a, by dielets 202b-202d, or by software such as, for example, driver software on a CPU.

For membar requests originated by local hardware engines of dielet 202a, the general membar handler 214 generates membar requests to other dielets 202b-202d as required and coordinates the receipt of acknowledgements from the local request and any requests to the other dielets, before responding to the requesting local hardware engine.

For membar requests received from any other dielet 202b-202d, the general membar handler 214 performs the requested operation with respect to the locally accessible memory 205 and returns the acknowledgments. In some embodiments, the general membar handler 214 may, through the external device controller 217, perform the requested operation also with respect to units that handle external communication interfaces (e.g., HSHUB). The membar synchronization mechanism in embodiments handles matrix processing units (MPUs) but is not limited to that. The synchronization mechanism may be configured to enable any set of synchronization points "scopes."

For software initiated membar operations, a mechanism is provided for the software to notify the FBHUB 204 to initiate the corresponding membar. The software may write a register, such as, for example, a privileged register (pri register), on dielet 202a, by sending a write request 222, to instruct the FBHUB 204 to trigger a membar. The pri register may also specify the scope of the membar (e.g., whether local scope or system scope). The register triggered membar handler 212 may be configured to trigger the membar in response to the status of the pri register set by the software.

Subsequently, the triggered membar is handled in coordination with the general membar handler 214, and an ack 224 with respect to the requested pri register triggered membar is provided to the requesting software. In some embodiments, the ack to the requesting software may be provided by a write 224 to a register. The register may be monitored by the software requesting the triggered membar.

The FBHUB-to-FBHUB sender/receiver 216 on FBHUB 204 may be configured to provide a channel for some hardware units on dielet 202a to communicate directly with other hardware units on different dielets. Messages are either sent to destinations within the same dielet, or forwarded to a remote FBHUB where they can be processed and sent to the destination hardware engine on the remote dielet.

Each FBHUB instance may also be configured to be responsible for forwarding acks to the appropriate FBHUB instance in remote dielets if the acks are not meant for the FBHUB that received them. This mechanism may be required to facilitate membars across all dielets in the multi-dielet GPU 200.

Figure 3:
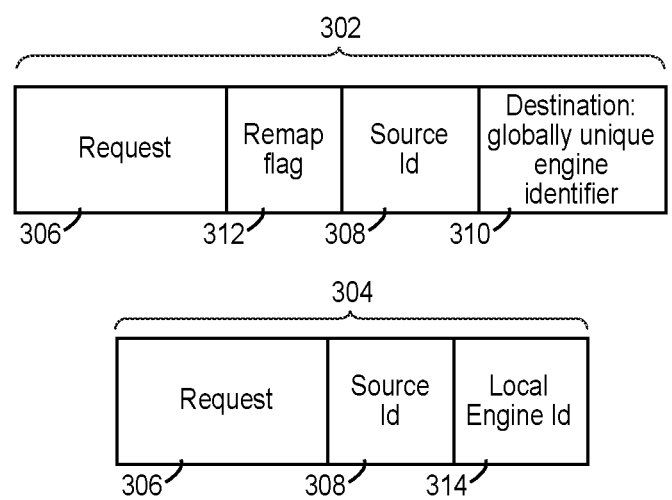
FIG. 3 illustrates an example of a request message which may be remapped with respect to local engine IDs and global engine IDs of hardware engines located on the multiple dielets, according to some embodiments of the present invention.

FIG. 3 illustrates examples of messages for which the remapper 210 may perform remapping between a globally unique engine ID and a corresponding local engine identifier of a hardware engine in a multi-dielet GPU 200.

Message 302 may be a request sent by an external processor, such as, for example, a CPU to the multi-dielet GPU 100 or 200. It may include a request field 306 that includes a request (e.g., instruction), a source identifier field 308 identifying the sender, and a destination identifier 310.

The destination identifier 310 is a globally unique engine identifier intended to uniquely identify a hardware engine in the multi-dielet GPU 200. The sender (e.g., the driver software on the CPU) may have knowledge of the presence, in the multi-dielet GPU 200, of a hardware engine capable of handling the particular request, but the sender may not have knowledge of the particular dielet on which that hardware engine is located. When there are more than one hardware engine of a particular type (e.g., more than one DMA engine) in the multi-dielet GPU 200, the sender may have knowledge of the number of such hardware engines that are in the multi-dielet GPU 200, but would not know their arrangement on the different dielets. For example, if the multi-dielet GPU 200 has 5 hardware DMA engines, the unified view provided by the multi-dielet GPU 200 may require the software to know that 5 DMA engines are in the multi-dielet GPU but would not require the software to know the distribution of the DMA engines among the four dielets (e.g., that dielet 202a has the first two DMA engines, and dielets 202b-202d each have one DMA engine). The globally unique engine ID enables the sender to uniquely identify a particular hardware engine in the multi-dielet GPU without knowing where (e.g., on which of the several dielets) in the multi-dielet GPU that hardware engine is located.

Message 302 may also include a remapping flag 312 indicating to the FBHUB to remap that destination address.

Message 304 may represent the message 302 after it is remapped by the FBHUB. The message 304 includes the same request 306 and same source identifier 308 from message 302, but has the globally unique engine identifier 310 replaced by the corresponding local engine identifier.

By providing this remapping capability at the FBHUB, the multi-GPU hardware enables the software, such as the driver software executing on the CPU, to be able to understand the multi-dielet GPU hardware as if it were a single GPU regardless of how many dielets exist and what the individual makeup of these dielets are. For example, as already noted, if the same DMA engine existed in multiple dielets and all those DMA engines are expected to operate as separate independent engines, software must be able to uniquely identify each of these engines and their software-exposed engine identifiers. Events such as faults, interrupts, page table binds, and others may depend on this uniqueness.

As noted above, each FBHUB may determine the engine identifiers of hardware units on its dielet by applying an offset. The offset may be determined based on the dielet's unique identifier. For example, for a hardware engine p that is present on each dielet 202a-202d, the globally unique engine identifier of it on each dielet can be calculate by applying a respectively different offset for each dielet. As also noted above, the offset may be determined by each FBHUB based on the dielet identifier of its dielet. The dielet identifier is unique within the multi-dielet GPU. Each FBHUB may determine the dielet identifier based on a fuse setting for the dielet.

Figure 4A:
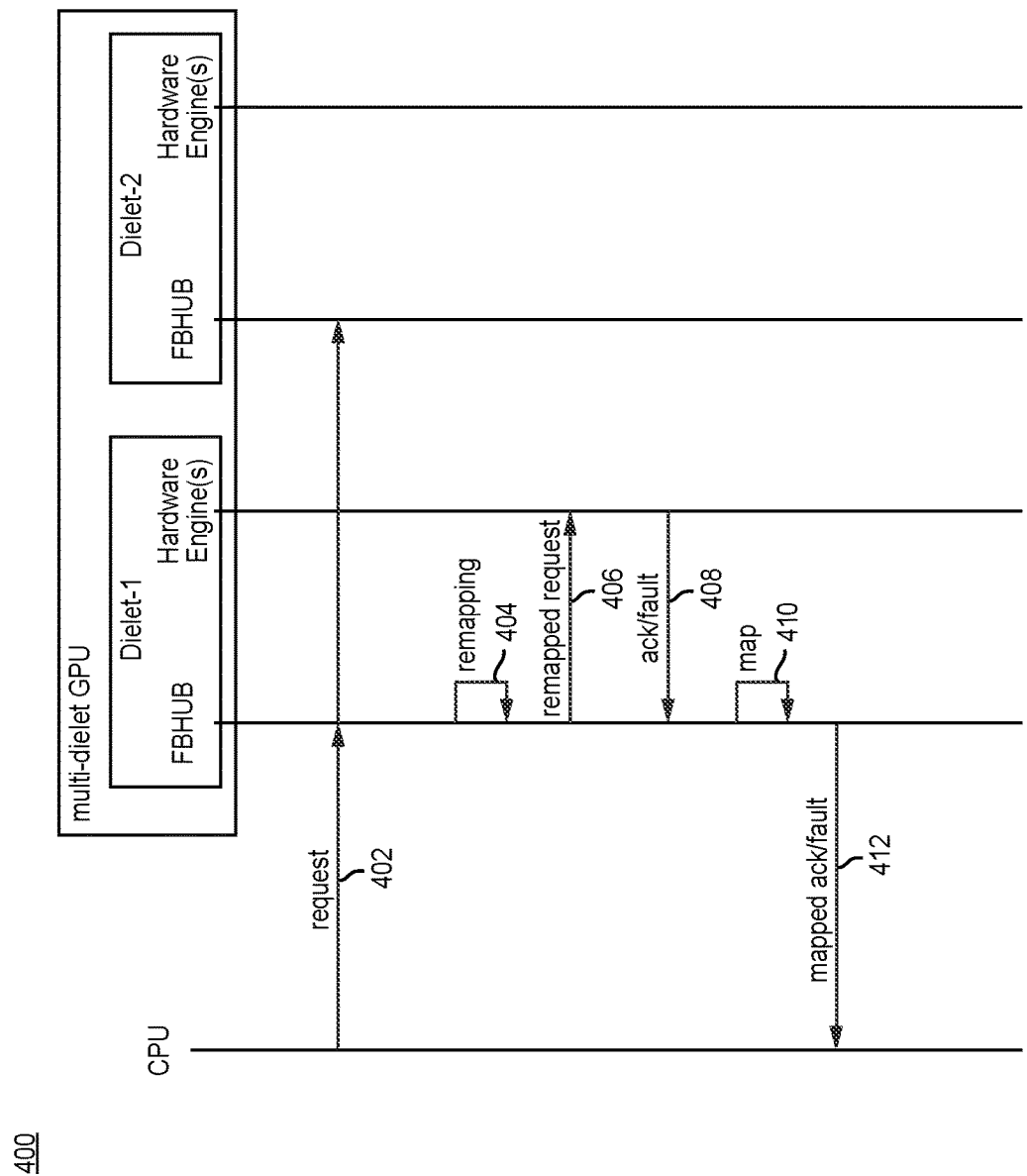
FIG. 4A illustrates an example interaction diagram between the CPU, a first dielet of the multi-dielet GPU, and a second dielet of the multi-dielet GPU, when a request from the CPU is received at the multi-dielet GPU, according to some embodiments of the present invention.

FIG. 4A illustrates an example interaction diagram 400 between the CPU, a first dielet of the multi-dielet GPU, and a second dielet of the multi-dielet GPU, when a request from the CPU is received at the multi-dielet GPU.

An example remapping interaction may begin at operation 402. At operation 402 a request is received at each of the two dielets in the multi-dielet GPU, such as, for example, multi-dielet GPU 100 or 200. The request may be received via a crossbar interface to which each of the dielets, and/or their FBHUBs, are connected. The request may be of the format 302 shown in FIG. 3, with a global engine ID as the address of the destination hardware engine. The source of the request may be a driver software executing on CPU (e.g., driver 122 executing on CPU 120).

Upon receipt of the request, each dielet's FBHUB checks whether the destination hardware engine is local to its dielet. As described above, each FBHUB may determine its dielet ID based on a fuse setting. According to some embodiments, each FBHUB determines the corresponding globally unique engine IDs for each of its hardware engines by adding an offset based on the dielet ID to the local engine ID. In the illustrated example, The FBHUB on dielet-2 determines that the request is not for that dielet, and ignores the request, and the FBHUB on dielet-1 recognizes that the request is for its dielet and proceeds to further processing of the received request.

Accordingly, at operation 404, the FBHUB on dielet-1 remaps the global engine ID in the request to the corresponding local engine ID. FIG. 3 provides an example request 302 with a global engine ID, and a remapped request 304 with the global engine ID being replaced with the corresponding local engine ID.

At operation 406 the remapped request is transmitted to the destination hardware engine identified by the local engine ID, and at operation 408, the ack or fault returned by the destination hardware engine is received at the FBHUB. Embodiments are not limited to any particular set of requests or any particular set or types of hardware engines.

At operation 410, the FBHUB maps the received ack or fault, which identifies its source by the local engine ID, to replace or otherwise include the corresponding global engine ID. At operation 412, the FBHUB of dielet-1 transmits the mapped ack or fault notification to the CPU. Identifying the source of any acks or fault notifications by corresponding global engine IDs provide for the CPU, or other sender of the corresponding request, to take appropriate processing steps. For example, if a fault notification is received in response to a request from the CPU, the CPU may reset the hardware engine that issued the fault notification.

Figure 4B:
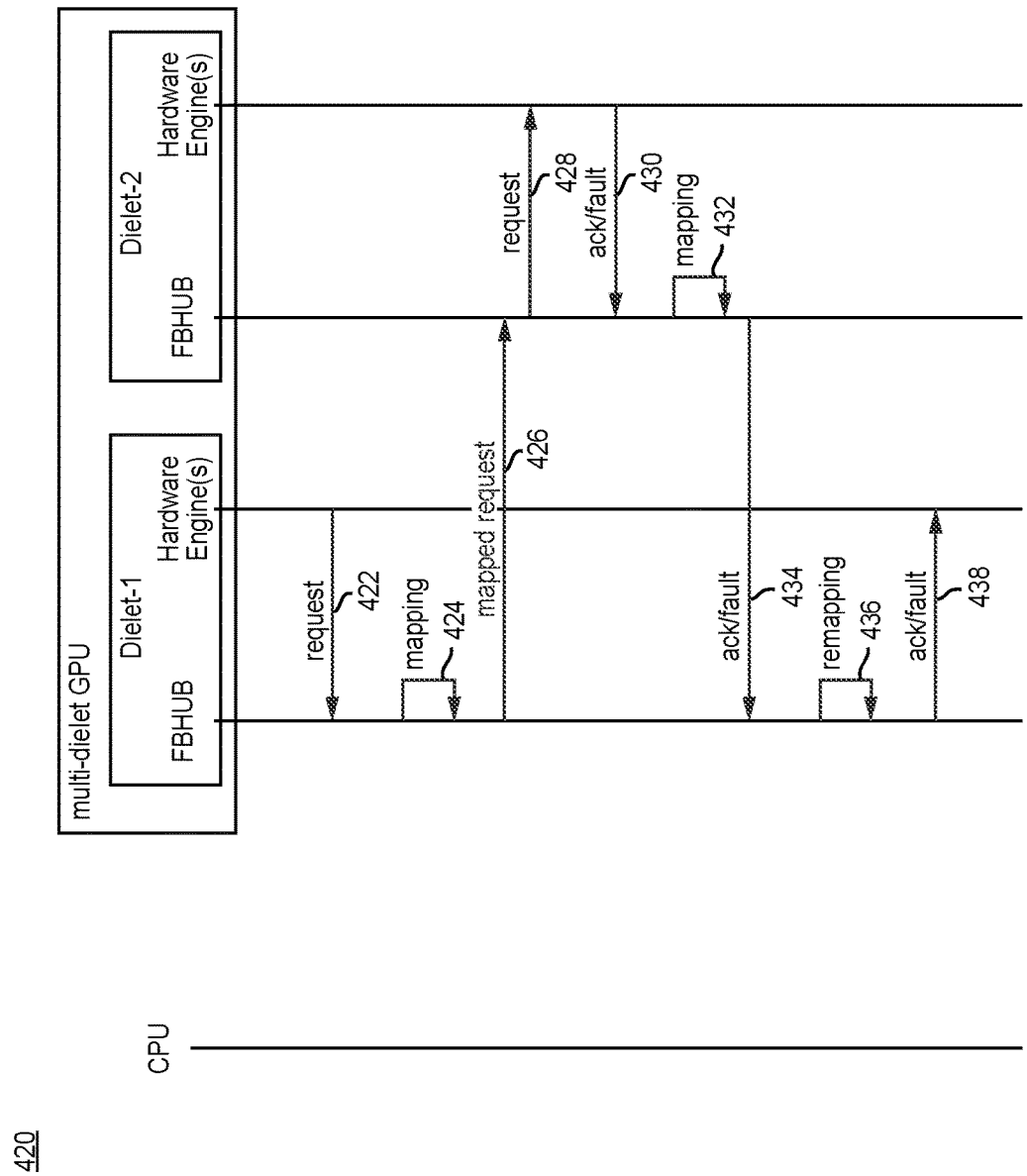
FIG. 4B illustrates an example interaction diagram between the CPU, a first dielet of the multi-dielet GPU, and a second dielet of the multi-dielet GPU, when a request from a hardware engine is received at a coordinating component in the multi-dielet GPU, according to some embodiments of the present disclosure.

FIG. 4B illustrates an example interaction diagram 420 between the CPU, a first dielet of the multi-dielet GPU, and a second dielet of the multi-dielet GPU, when a request from a hardware engine is received at an FBHUB in the multi-dielet GPU.

An example mapping interaction begins at operation 422. At operation 422, a hardware engine with local engine ID x on dielet-1 issues a request for a service that requires another hardware engine on the multi-dielet GPU. The request is received by the FBHUB on dielet-1, the FBHUB, at operation 424, maps the source address from the local engine ID x to its corresponding global engine ID. Mapping was described above.

At operation 426, the mapped request (i.e., the request with at least its source address mapped from the local engine ID to the corresponding global engine ID) is transmitted by the FBHUB on dielet-1 on a crossbar to other dielets in the multi-dielet GPU. According to an example, if the request is for accessing memory, each FBHUB may determine whether its for a local DMA hardware engine by the request's memory address.

At operation 428, the FBHUB on dielet-2 detects the request is for one of its local hardware engines, and transmits the request to the appropriate local hardware engine. If the request included that destination hardware engine ID as a global engine ID, then a remapping may be performed by the FBHUB on dielet-2 prior to transmitting 428.

At operation 430, the destination hardware engine returns an ack or fault notification in response to the request 428. At operation 432, a mapping is performed by the FBHUB on dielet-2 to map the local engine ID of the hardware engine that issues the ack or fault to its global equivalent. Then at operation 434 the ack is transmitted to the FBHUB at dielet-1. The ack or fault notification received by the FBHUB at dielet-1 may have its destination engine and the source engine both identified by corresponding global engine IDs.

At operation 436, the FBHUB on dielet-1 remaps at least the destination address of the ack or fault notification from the global engine ID to the corresponding local engine ID before transmitting it, at operation 438, to the request originating hardware engine. It should be noted that 430 may not be limited to ack or fault indication, and, for example, may include other types of responses (e.g., data from a memory read) triggered by the requested operation itself.

The FBHUB is responsible for ensuring a membar.gpu operation pushes all prior memory accesses from all FBHUB clients (such as, e.g., DMA, front-end, etc.) to GPU-scope visibility. The FBHUB is also responsible for ensuring a membar.sys operation pushing all prior GPU-scope visible requests (from all GPU clients including SMs) to system-scope visibility. The membar.gpu and membar.sys operations are performed in order to provide a consistent view of the memory model that multiple processes/threads could rely on when sharing memory. In the multi-dielet GPU of example embodiments (e.g., multi-dielet GPU 100 or 200) the FBHUB of the GPU that receives the request(s) ensures that related operations performed by any of the other GPUs in the multi-dielet GPU all get pushed to the point of coherency. Since in some embodiments the multi-dielet GPU has a unified memory in which the individual GPUs can directly access each other's memory, depending on where the request is directed to, there may be multiple points of coherency. The FBHUB of the GPU that received, or triggered, the initial membar operation waits for acks to be received from all the destinations for the membar, and when all the acks have been received, the FBHUB acknowledges that the memory barrier has completed. After the FBHUB has acknowledged the memory barrier, it is safe for the source (e.g., hardware or software source) of the memory barrier request or any other entity to assume that the request(s) that preceded the memory barrier has taken effect or will take effect.

This process is required to be orchestrated across all the hardware engines and all the memory that are distributed across the multiple dielets in the multi-dielet GPU. The membar command is routed to all dielets that are reachable. For example, the membar command is sent to all dielets that are reachable through the crossbar, and all acks responsive to the membar command are collected.

After all the acks for the membar command have been received ensuring their GPU-scope visibility, then the next sequence can be issued to ensure their SYSTEM-scope visibility (if the original membar command had a SYSTEM scope requirement). The next sequence is for flushing the I/O. The I/O flush is to ensure that the I/O, in some embodiments, the interconnection (e.g., external communication interfaces such as, NVLINK PCI, etc.) between the dielets/GPU's, are flushed of the previous requests. That is to ensure that the requests that preceded the membar command have been acknowledged by the destination/peer GPUs.

Since the I/Os are split among multiple dielets (e.g., the 2 dielets in the multi-dielet GPU 100), this procedure is required to be orchestrated. The orchestration proceeds as follows:

The FBHUB that received the membar request issues I/O flush requests to its own I/O (i.e., I/O on same dielet) and also issues an I/O flush request to the second dielet over the FBHUB to FBHUB point to point connection. The FBHUB on the second dielet issues I/O flush requests to the I/O entities on that dielet, collects corresponding acks, and acks the request from the first FBHUB.

There could be scenarios that more than one FBHUB in the multi-dielet GPU is performing a memory barrier at a particular time. In that case, since two or more memory barriers are being concurrently performed, steps are needed to ensure that they occur in a deadlock-free manner (e.g., without circular dependencies).

In some embodiments, each FBHUB runs two separate state machines—a first state machine controls the local memory barrier I/O flush and a second state machine to control the remote memory barrier I/O flush operation to the remote FBHUB. This provides for a mode of operation where each dielet can process a membar I/O flush operation that is local and a membar I/O flush request from a another dielet. Parallel and independent.

Think of the IO flush FSM as being capable of being called by multiple clients for respective IO flush commands. When the FSM receives an IO flush request from a local client, it must also send a request to the other dielets. The processing of the local IO flushes can proceed without waiting for a response from the other dielets. On each of the other dielets, the FBHUB in that dielet will issue IO flush requests to local clients, collect the acks from the local clients, and send an ack, indicating completion of the I/O flush to the requesting dielet.

While waiting for the ack from the remote FBHUB(s), the FSM can serially process IO flush requests from other entities such as SMs. The source of the memory may be from many places—for example, hardware engine, syspipes, or even via software.

With multi-dielet GPU, a pri-based view is provided so that the software can issue a membar command via a pri-interface command on any one or more of the FBHUB. This is a quick way for software to inject a membar without using a dedicated hardware unit. Through a pri-based register, software may trigger a membar on any of the dielets. In the case of software-initiated membar through pri register, software is responsible to trigger the membar on any group of dielets or all the dielets.

Figure 5A:
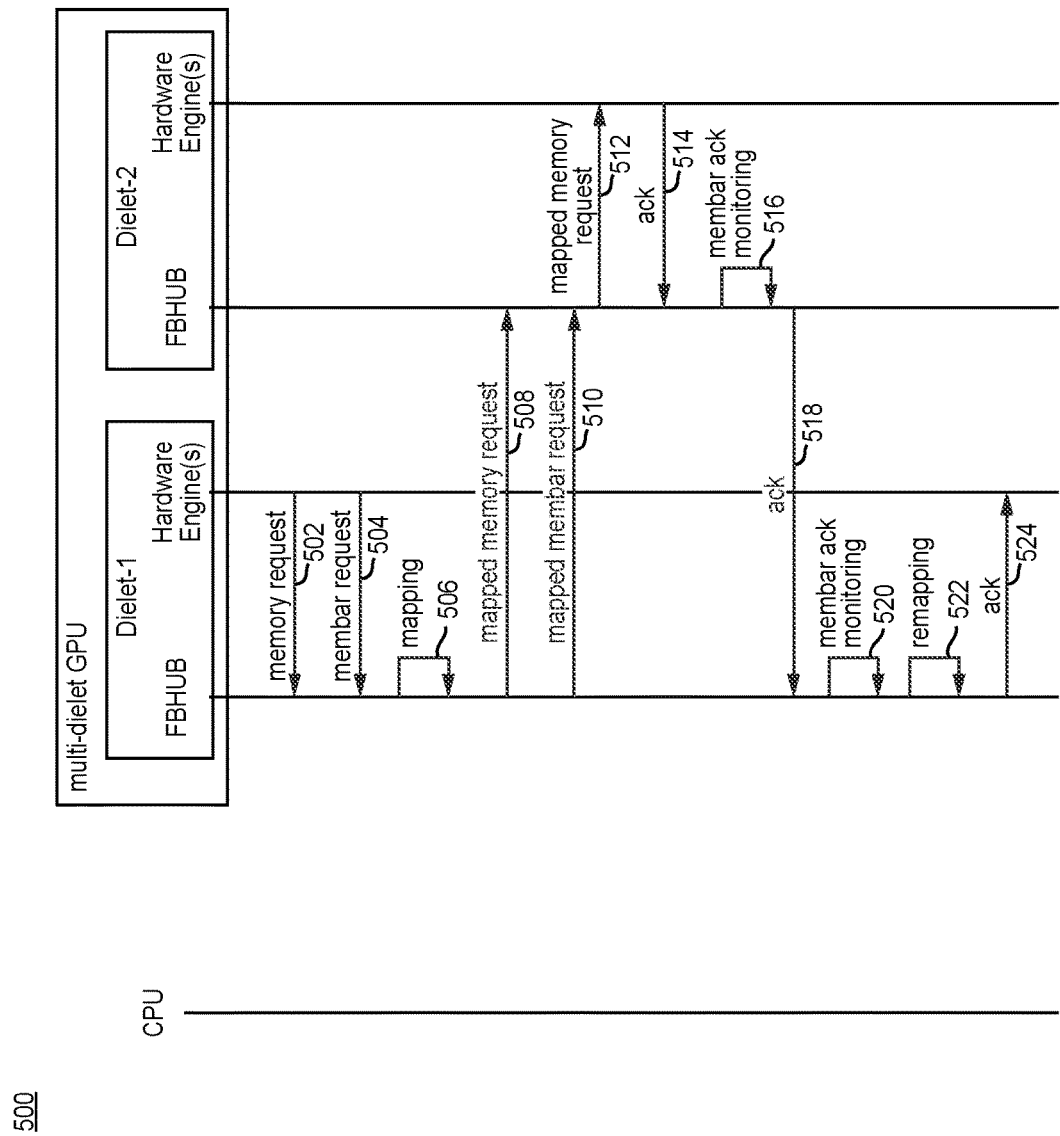
FIG. 5A illustrates an example interaction diagram between the CPU, a first dielet of the multi-dielet GPU, and a second dielet of the multi-dielet GPU, when a memory request from a hardware engine of the multi-dielet GPU is received at a coordinating components of the multi-dielet GPU, according to some embodiments of the present disclosure.

FIG. 5A illustrates an example interaction diagram between the CPU, a first dielet of the multi-dielet GPU, and a second dielet of the multi-dielet GPU, when a memory request from a hardware engine of the multi-dielet GPU is received at an FBHUB of the multi-dielet GPU.

At operation 502, a source hardware engine on the dielet-1 transmits one or more memory requests. For example, one or more threads executing on an SM on dielet-1 may issue the memory requests 502. Following the memory requests 502, the source hardware engine ID may issue a memory barrier (membar) request 504. The FBHUB on dielet-1 receives the memory requests and the membar request, and maps the source address from the local engine ID to the corresponding global ID at operation 506.

The mapped memory requests and the mapped membar request are transmitted at operations 508 and 510, respectively, to other dielets. In this scenario, mapped requests and the mapped membar are received at the FBHUB on dielet-2.

At operation 512, the FBHUB on dielet-2 determined the appropriate hardware engine and transmits the memory requests to that hardware engine unit. At operation 514, the hardware unit returns acks or fault notification corresponding to the memory request(s) to the FBHUB on dielet-2.

At operation 516, the FBHUB on dielet-2 monitors whether acks have been received for all the memory requests destined for its local hardware engine. When it is determined that all the acks have been received, at operation 518 FBHUB on diuelet-1 is sent an ack, and the membar at dielet-2 is cleared.

At operation 520, the FBHUB on dielet-1 monitors whether acks have been received for all the memory requests destined for its local hardware engine. When it is determined that all the acks have been received, at operation 522 the ack is remapped to convert the global engine ID to the corresponding local engine ID of source hardware engine. At operation 524, the remapped ack is sent to the source hardware engine ID.

Figure 5B:
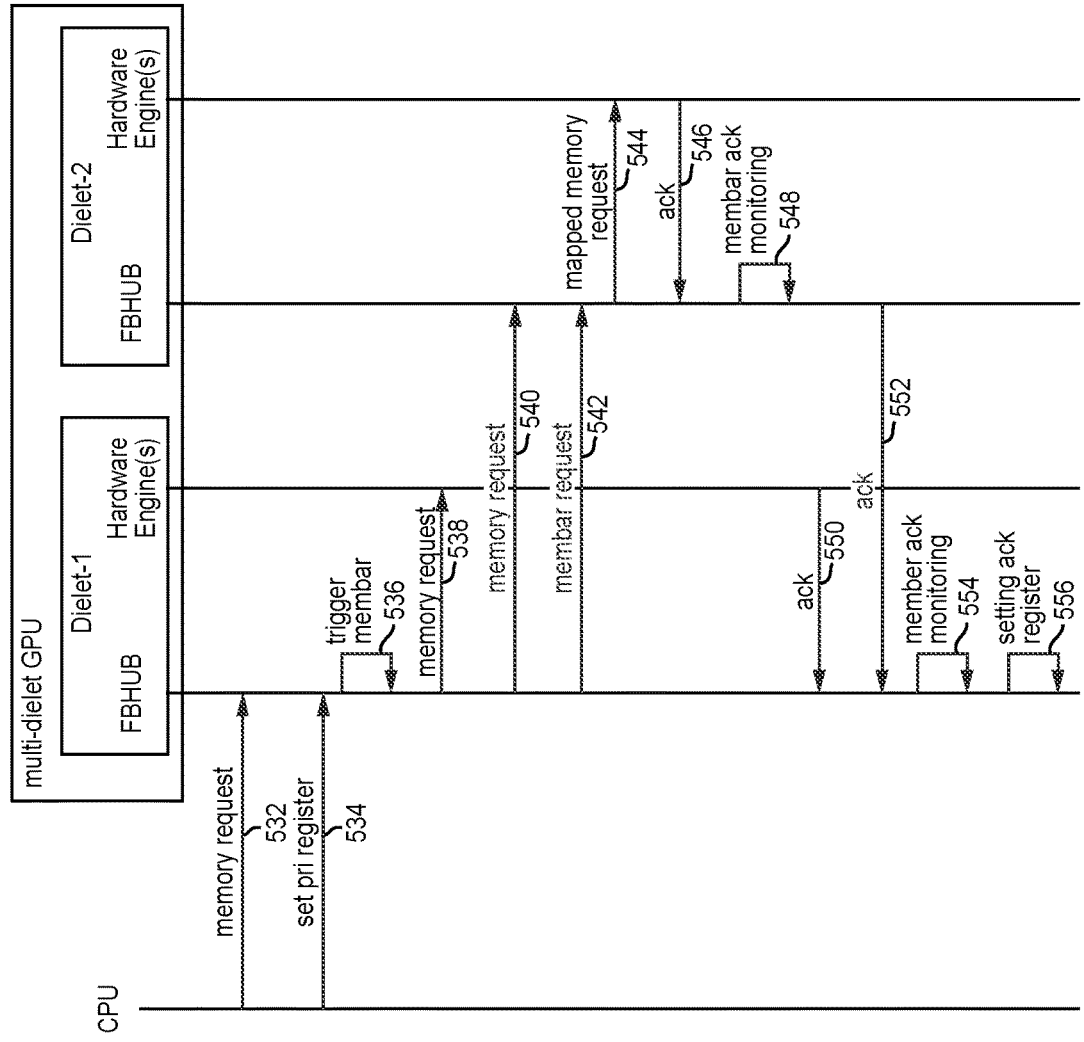
FIG. 5B illustrates an example interaction diagram between the CPU, a first dielet of the multi-dielet GPU, and a second dielet of the multi-dielet GPU, when the software on the CPU sends one or more memory requests to the multi-dielet GPU and then sets a register to trigger a memory barrier ("membar") operation, according to some embodiments of the present disclosure.

FIG. 5B illustrates an example interaction diagram between the CPU, a first dielet of the multi-dielet GPU, and a second dielet of the multi-dielet GPU, when the software on the CPU sends one or more memory requests to the multi-dielet GPU and then sets a pri register to trigger a membar operation.

An example interaction 530 by which the software executing on a CPU can trigger a membar on a multi-dielet GPU may begin at operation 532. At operation 532, the software issues a memory request that is received at the FBHUB of dielet-1 which determines that the request is destined for a local hardware engine. At operation 538, the FBHUB may transmit the request, after mapping the destination engine ID from a global ID specified in the received request to a local engine ID, to the local hardware engine.

As described above, the determination whether a memory request is to be handled locally may be based on a memory address or memory address range in the received request. Accordingly, if the FBHUB on dielet-1 determines that part of the request involves another dielet, the request is sent to the FBHUB on dielet-2 at operation 540. At operation 544, the FBHUB on dielet-2 transmits the request to its local hardware engine after performing any remapping of the destination engine ID as required.

In response to operation 538, the destination hardware engine on dielet-1 returns an ack at operation 550. Similarly, in response to operation 544 the destination hardware engine on dielet-2 returns an ack at operation 546 to FBHUB on dielet-2. The FBHUB on dielet-2, at operation 552, transmits the ack acknowledging the request received at operation 540, after performing any mapping of the source hardware address as needed.

The software may, for the transmitted memory requests, cause a membar to be triggered by, at operation 534, setting a register accessible to the FBHUB on dielet-1. For example, a dedicated privileged register (pri register) may be set.

At operation 536, upon detecting the writing to the register, FBHUB on dielet-1 triggers a membar and accordingly, at operation 554, monitors the acks corresponding to the memory request. The FBHUB on dielet-1 also transmits, at operation 542, the membar request to the FBHUB on dielet-2, since the FBHUB on dielet-1 transmitted memory requests to the second dielet. In response to the membar request, the FBHUB on dielet-2 initiates, at operation 548, monitoring for acks corresponding to the memory request.

When the monitoring at 548 determines that the required acks have been received, the FBHUB on dielet-2 transmits an ack at operation 552 to the FBHUB on dielet-1. When the monitoring at 554, determines that the memory request issued locally is acknowledged at 550, and that the memory request to dielet-2 is acknowledged at 552, the FBHUB on dielet-1 determines that the membar is complete, and at operation 556 sets an acknowledgment register. The software may periodically read the acknowledgment register to determine whether the membar has completed. MPUs or HSHUB type external interfacing units are in some embodiments spread across multiple dielets. Whereas in a single dielet system, synchronizing across MPUs meant seeing all required traffic travel through one point in the hardware, in multi-dielet systems according to embodiments of this disclosure, software can continue to operate as if there is a single synchronizing point in hardware although it is now a single point in each of the multiple dielets (i.e., multiple points in the multi-dielet system).

Figure 6:
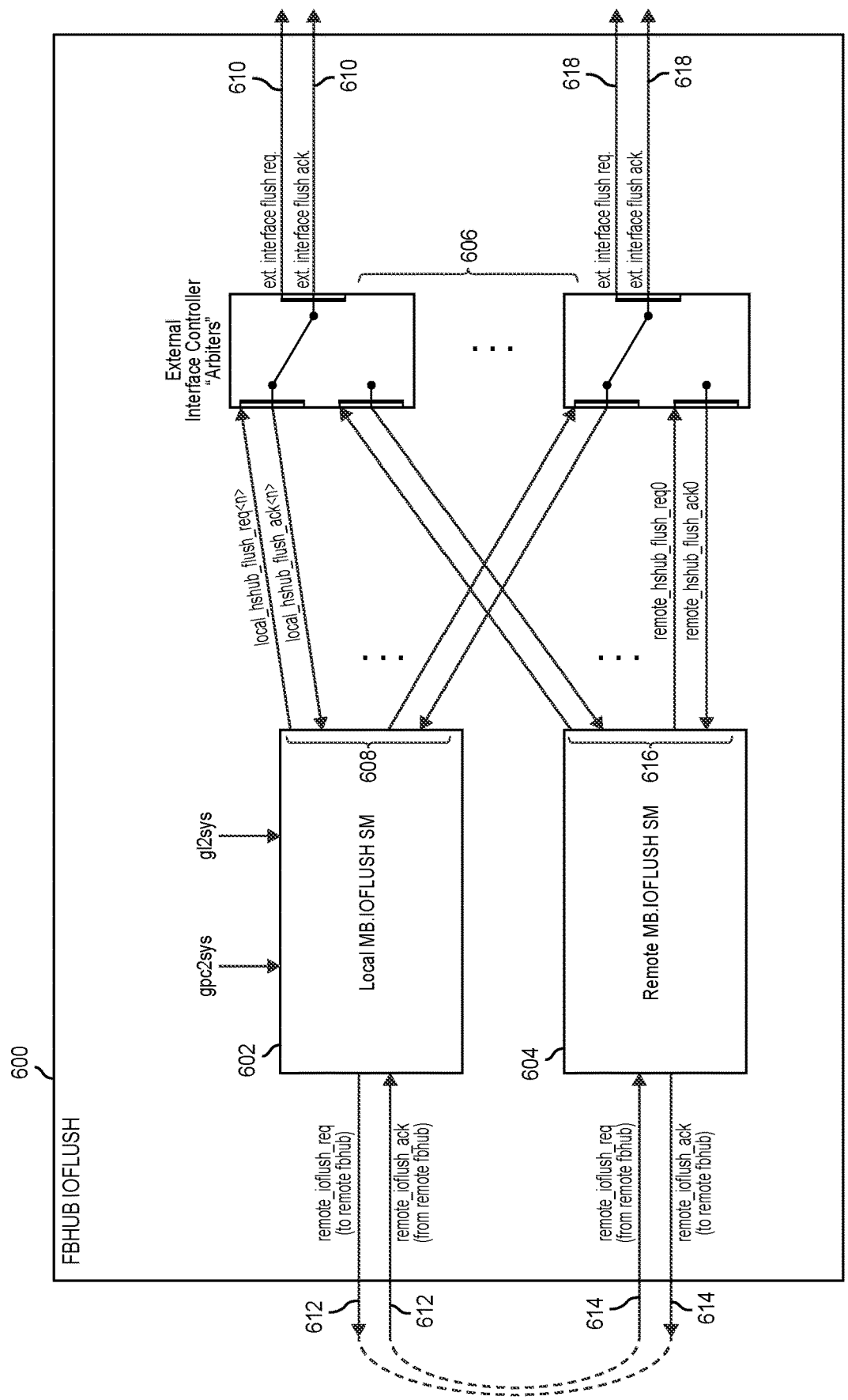
FIG. 6 illustrates a dual finite state machine (FSM) hardware arrangement for input/output (I/O) flush operations in the membar process, according to some embodiments of the present disclosure.

FIG. 6 illustrates a dual finite state machine (FSM) hardware arrangement 600 for input/output (I/O) flush operations in the membar process. The flush operation may be part of a membar operation.

The dual FSM hardware arrangement 600 provides for each FBHUB to ensure that I/Os are flushed following a membar operation. The hardware arrangement 600 includes a first FSM 602 and a second FSM 604. The first FSM 602, tracks the membar requests from local hardware engines such as from the GPC and video memory. The second FSM 604 tracks the membar requests from remote FBHUBs.

The local FSM 602 may track each membar issued by local hardware engines such as, for example, the GPC or video memory. Corresponding to each membar request, the FSM 602 issues a flush request 608 to the relevant local I/O. In some embodiments, the local flush requests are sent to an external interface controller arbiter (e.g., HSHUB) 606. The external interface controller arbiter 606, transmits the flush requests 610 and collects corresponding flush acks. The external interface controller arbiter 606 returns the flush acks to the requesting FSM 602.

The local FSM 602 also, if it determines that memory traffic has taken a path to an external interface from a remote dielet, issues remote flush requests 612 to the one or more remote dielets and the corresponding acks 612 are monitored.

The second FSM 604 services flush requests from remote dielets. For example, for each flush request 614 received from a remote dielet, the FSM 604 issues one or more flush requests 616 to local hardware engines and collects corresponding acks. The external interface controller arbiter 606 transmits the flush requests 618 to the respective hardware engines and collects corresponding acks which are then returned to the FSM 604.

The dual state machine design enables each FBHUB instance to simultaneously issue a remote I/O flush to a remote FBHUB and accept and process a remote I/O flush request from a remote FBHUB. This simultaneous characteristic allows multi-dielet scaling without introducing interference between the dielets and avoids mutual deadlock.

In an example scenario, software wants to issue a DMA command to move some memory traffic that in the multi-dielet GPU is spread between two dies. An FBHUB according to example embodiments provides for the software to simply issue some memory traffic, and issue a membar command with system memory scope. The FBHUB, in hardware, must understand how to communicate across all the dielets so that it covers all engines on any die.

Without the FBHUB of the example embodiments, the software would have to know that the memory concerned involved access by two dielets, issue respective commands to the two dielets and handle the synchronization (e.g., that both the transfers are at a point of coherency, issue separate membar commands for each of the dielets) on its own. The software has knowledge that there are two DMA engines, but doesn't know where (i.e., which dielet) they are. Each DMA engine also does not have knowledge of its own engine ID in the multi-dielet GPU configuration, and only knows its local engine ID. The FBHUB does the mapping. A fuse setting determines the ID of the FBHUB.

It is important to understand that the mapping can be with respect to commands received from the driver running on the CPU or from threads running on the streaming multi-processor (SM) of a GPU. The hardware components addition to the FBHUB hides the complexity of the design from the software.

During operation, it may be one software context that is extended over the several dielets in a multi-dielet GPU.

The dielets can be same or can differ in design, can be of different generations, sizes etc. (e.g., stack/asymmetrical, centralized die etc.). One or more dielet can have one or more GPUs allowing for GPU of arbitrary complexity.8

Figure 7:
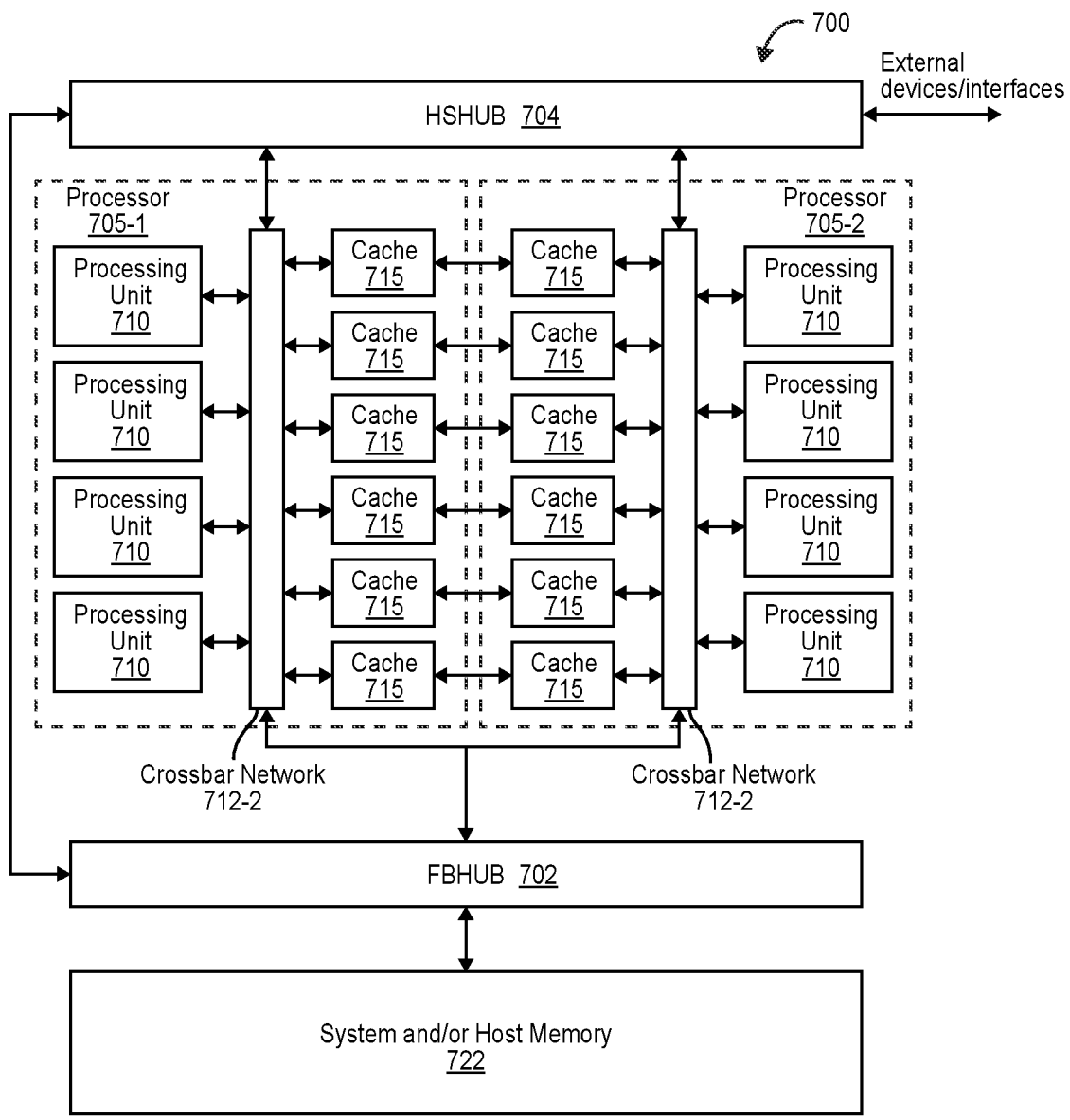
FIG. 7 illustrates an example GPU on a dielet of the multi-dielet GPU, with its frame buffer hub (FBHUB) and high speed hub (HSHUB) identified in relation to some of their interconnections, according to some embodiments of the present disclosure.

FIG. 7 illustrates an example GPU 700 on a dielet of the multi-dielet GPU, with its frame buffer hub (FBHUB) 702 and high speed hub (HSHUB) 704 identified in relation to some of their interconnections, according to some embodiments of the present disclosure. The GPU 700 includes two processors 705-1 and 705-2, with each processor comprising a plurality of processing units 710 connected to cache memory 715. Respective crossbars 712-1 and 712-2 interconnects processing units 710 and memory 715 in processors 705-1 and 705-2. A high speed hub (HSHUB) 718 connects all the processing units 710 and cache memory 715. The HSBUB may also be a controller used to communicate with external devices/interfaces. A framebuffer hub (FBHUB) 720 provides access to system and/or host memory 722 to processing units 710, which connect to the FBHUB 720 via HSHUB 718 or directly through crossbar network 712-2.

Example GPU Architecture

An example illustrative architecture in which the remapping and synchronization are efficiently performed will now be described. The following information is set forth for illustrative purposes and should not be construed as limiting in any manner. Any of the following features may be optionally incorporated with or without the exclusion of other features described.

Figure 8:
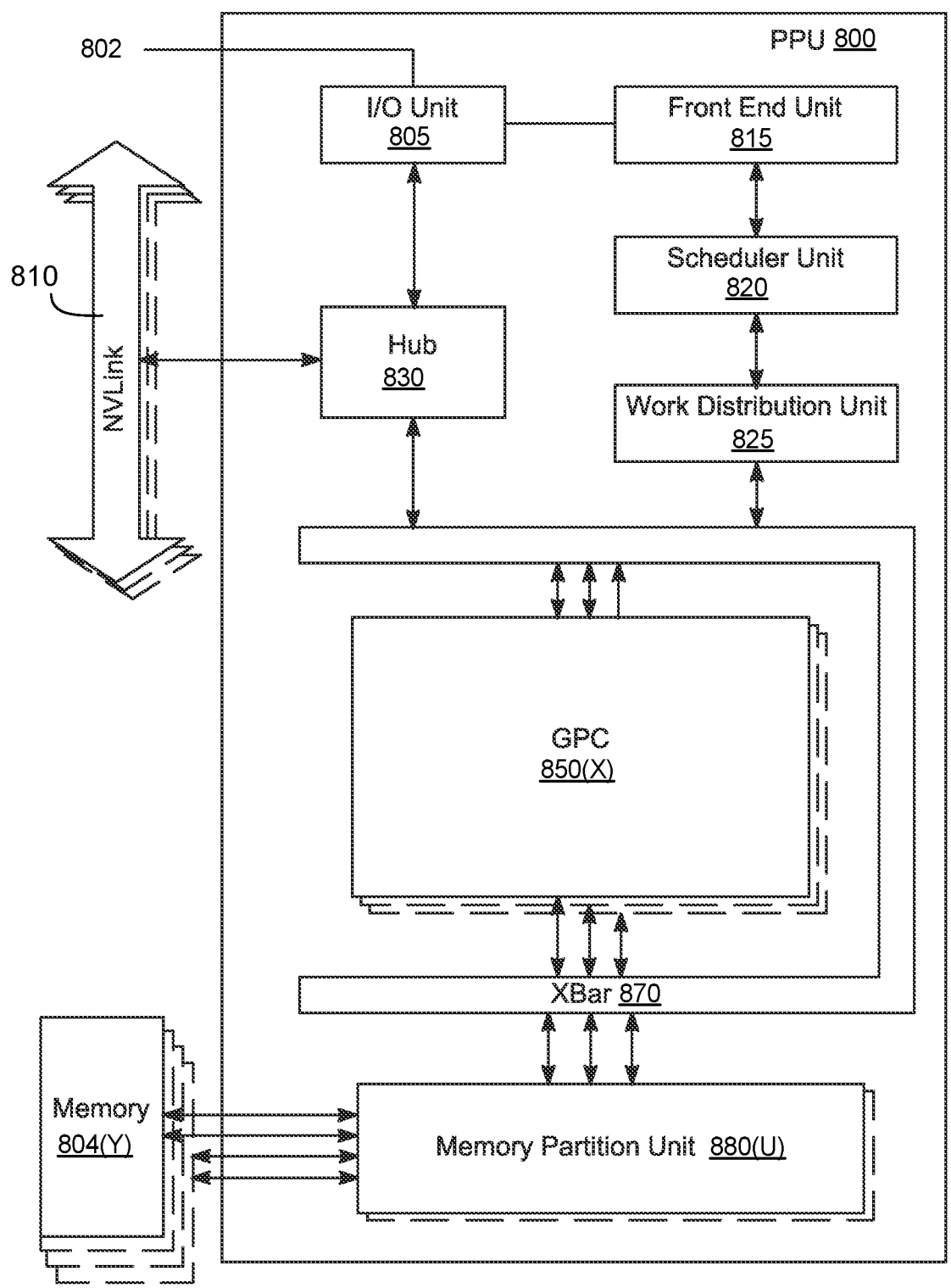
FIG. 8 illustrates an example parallel processing unit of a GPU, according to some embodiments.

FIG. 8 illustrates a parallel processing unit (PPU) 800, in accordance with an embodiment. In an embodiment, the PPU 800 is a multi-threaded processor that is implemented on one or more integrated circuit devices. The PPU 800 is a latency hiding architecture designed to process many threads in parallel. A thread (e.g., a thread of execution) is an instantiation of a set of instructions configured to be executed by the PPU 800. In an embodiment, the PPU 800 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 800 may be utilized for performing general-purpose computations. In some other embodiments, PPU 800 configured to implement large neural networks in deep learning applications or other high performance computing applications.

One or more PPUs 800 may be configured to accelerate thousands of High Performance Computing (HPC), data center, and machine learning applications. The PPU 800 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the PPU 800 includes an Input/Output (I/O) unit 805, a front end unit 815, a scheduler unit 820, a work distribution unit 825, a hub 830, a crossbar (Xbar) 870, one or more general processing clusters (GPCs) 850, and one or more memory partition units (MPU) 880. The PPU 800 may be connected to a host processor or other PPUs 800 via one or more high-speed NVLink 810 interconnect. The PPU 800 may be connected to a host processor or other peripheral devices via an interconnect 802. The PPU 800 may also be connected to a memory comprising a number of memory devices 804. In an embodiment, the memory 804 may comprise a number of dynamic random access memory (DRAM) devices. The DRAM devices may be configured as a high-bandwidth memory (HBM) subsystem, with multiple DRAM dies stacked within each device.

The NVLink 810 interconnect enables systems to scale and include one or more PPUs 800 combined with one or more CPUs, supports cache coherence between the PPUs 800 and CPUs, and CPU mastering. Data and/or commands may be transmitted by the NVLink 810 through the hub 830 to/from other units of the PPU 800 such as one or more copy engines, a video encoder, a video decoder, a power management unit, etc. (not explicitly shown). The NVLink 810 is described in more detail in conjunction with FIG. 11A and FIG. 11B.

The I/O unit 805 is configured to transmit and receive communications (e.g., commands, data, etc.) from a host processor (not shown) over the interconnect 802. The I/O unit 805 may communicate with the host processor directly via the interconnect 802 or through one or more intermediate devices such as a memory bridge. In an embodiment, the I/O unit 805 may communicate with one or more other processors, such as one or more of the PPUs 800 via the interconnect 802. In an embodiment, the I/O unit 805 implements a Peripheral Component Interconnect Express (PCIe) interface for communications over a PCIe bus and the interconnect 802 is a PCIe bus. In alternative embodiments, the I/O unit 805 may implement other types of well-known interfaces for communicating with external devices.

The I/O unit 805 decodes packets received via the interconnect 802. In an embodiment, the packets represent commands configured to cause the PPU 800 to perform various operations. The I/O unit 805 transmits the decoded commands to various other units of the PPU 800 as the commands may specify. For example, some commands may be transmitted to the front end unit 815. Other commands may be transmitted to the hub 830 or other units of the PPU 800 such as one or more copy engines, a video encoder, a video decoder, a power management unit, etc. (not explicitly shown). In other words, the I/O unit 805 is configured to route communications between and among the various logical units of the PPU 800.

In an embodiment, a program executed by the host processor encodes a command stream in a buffer that provides workloads to the PPU 800 for processing. A workload may comprise several instructions and data to be processed by those instructions. The buffer is a region in a memory that is accessible (e.g., read/write) by both the host processor and the PPU 800. For example, the I/O unit 805 may be configured to access the buffer in a system memory connected to the interconnect 802 via memory requests transmitted over the interconnect 802. In an embodiment, the host processor writes the command stream to the buffer and then transmits a pointer to the start of the command stream to the PPU 800. The front end unit 815 receives pointers to one or more command streams. The front end unit 815 manages the one or more streams, reading commands from the streams and forwarding commands to the various units of the PPU 800.

The front end unit 815 is coupled to a scheduler unit 820 that configures the various GPCs 850 to process tasks defined by the one or more streams. The scheduler unit 820 is configured to track state information related to the various tasks managed by the scheduler unit 820. The state may indicate which GPC 850 a task is assigned to, whether the task is active or inactive, a priority level associated with the task, and so forth. The scheduler unit 820 manages the execution of a plurality of tasks on the one or more GPCs 850.

The scheduler unit 820 is coupled to a work distribution unit 825 that is configured to dispatch tasks for execution on the GPCs 850. The work distribution unit 825 may track a number of scheduled tasks received from the scheduler unit 820. In an embodiment, the work distribution unit 825 manages a pending task pool and an active task pool for each of the GPCs 850. The pending task pool may comprise a number of slots (e.g., 32 slots) that contain tasks assigned to be processed by a particular GPC 850. The active task pool may comprise a number of slots (e.g., 4 slots) for tasks that are actively being processed by the GPCs 850. As a GPC 850 finishes the execution of a task, that task is evicted from the active task pool for the GPC 850 and one of the other tasks from the pending task pool is selected and scheduled for execution on the GPC 850. If an active task has been idle on the GPC 850, such as while waiting for a data dependency to be resolved, then the active task may be evicted from the GPC 850 and returned to the pending task pool while another task in the pending task pool is selected and scheduled for execution on the GPC 850.

The work distribution unit 825 communicates with the one or more GPCs 850 via XBar 870. The XBar 870 is an interconnect network that couples many of the units of the PPU 800 to other units of the PPU 800. For example, the XBar 870 may be configured to couple the work distribution unit 825 to a particular GPC 850. Although not shown explicitly, one or more other units of the PPU 800 may also be connected to the XBar 870 via the hub 830.

The tasks are managed by the scheduler unit 820 and dispatched to a GPC 850 by the work distribution unit 825. The GPC 850 is configured to process the task and generate results. The results may be consumed by other tasks within the GPC 850, routed to a different GPC 850 via the XBar 870, or stored in the memory 804. The results can be written to the memory 804 via the partition units 880, which implement a memory interface for reading and writing data to/from the memory 804. The results can be transmitted to another PPU 804 or CPU via the NVLink 810. In an embodiment, the PPU 800 includes a number U of partition units 880 that is equal to the number of separate and distinct memory devices 804 coupled to the PPU 800. A partition unit 880 will be described in more detail below in conjunction with FIG. 9B.

In an embodiment, a host processor executes a driver kernel that implements an application programming interface (API) that enables one or more applications executing on the host processor to schedule operations for execution on the PPU 800. In an embodiment, multiple compute applications are simultaneously executed by the PPU 800 and the PPU 800 provides isolation, quality of service (QOS), and independent address spaces for the multiple compute applications. An application may generate instructions (e.g., API calls) that cause the driver kernel to generate one or more tasks for execution by the PPU 800. The driver kernel outputs tasks to one or more streams being processed by the PPU 800. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory (SMEM). Threads, cooperating threads and a hierarchical grouping of threads such as cooperating thread arrays (CTA) and cooperating group arrays (CGA) according to some embodiments are described in more detail in U.S. application Ser. No. 17/691,621, the content of which is hereby incorporated by reference in its entirety. The SMEM, according to some embodiments, is described in U.S. application Ser. No. 17/691,690, which is hereby incorporated in reference in its entirety.

Figure 9A:
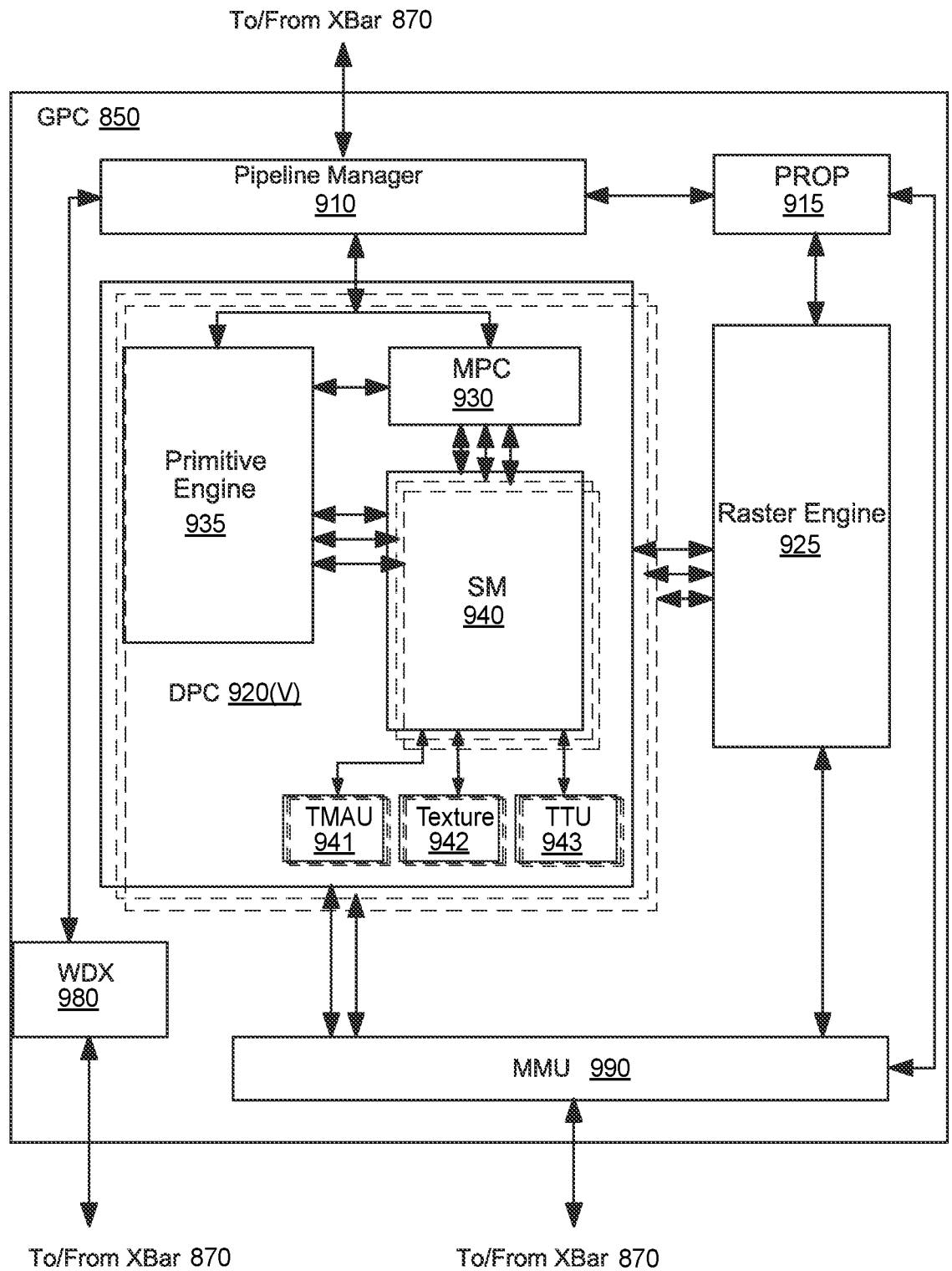
FIG. 9A illustrates an example general processing cluster (GPC) within the parallel processing unit of FIG. 8, according to some embodiments.

FIG. 9A illustrates a GPC 850 of the PPU 800 of FIG. 8, in accordance with an embodiment. As shown in FIG. 9A, each GPC 850 includes a number of hardware units for processing tasks. In an embodiment, each GPC 850 includes a pipeline manager 910, a pre-raster operations unit (PROP) 915, a raster engine 925, a work distribution crossbar (WDX) 980, a memory management unit (MMU) 990, and one or more Data Processing Clusters (DPCs) 920. It will be appreciated that the GPC 850 of FIG. 9A may include other hardware units in lieu of or in addition to the units shown in FIG. 9A.

In an embodiment, the operation of the GPC 850 is controlled by the pipeline manager 910. The pipeline manager 910 manages the configuration of the one or more DPCs 920 for processing tasks allocated to the GPC 850. In an embodiment, the pipeline manager 910 may configure at least one of the one or more DPCs 920 to implement at least a portion of a graphics rendering pipeline, a neural network, and/or a compute pipeline. For example, with respect to a graphics rendering pipeline, a DPC 920 may be configured to execute a vertex shader program on the programmable streaming multiprocessor (SM) 940. The pipeline manager 910 may also be configured to route packets received from the work distribution unit 825 to the appropriate logical units within the GPC 850. For example, some packets may be routed to fixed function hardware units in the PROP 915 and/or raster engine 925 while other packets may be routed to the DPCs 920 for processing by the primitive engine 935 or the SM 940.

Figure 9B:
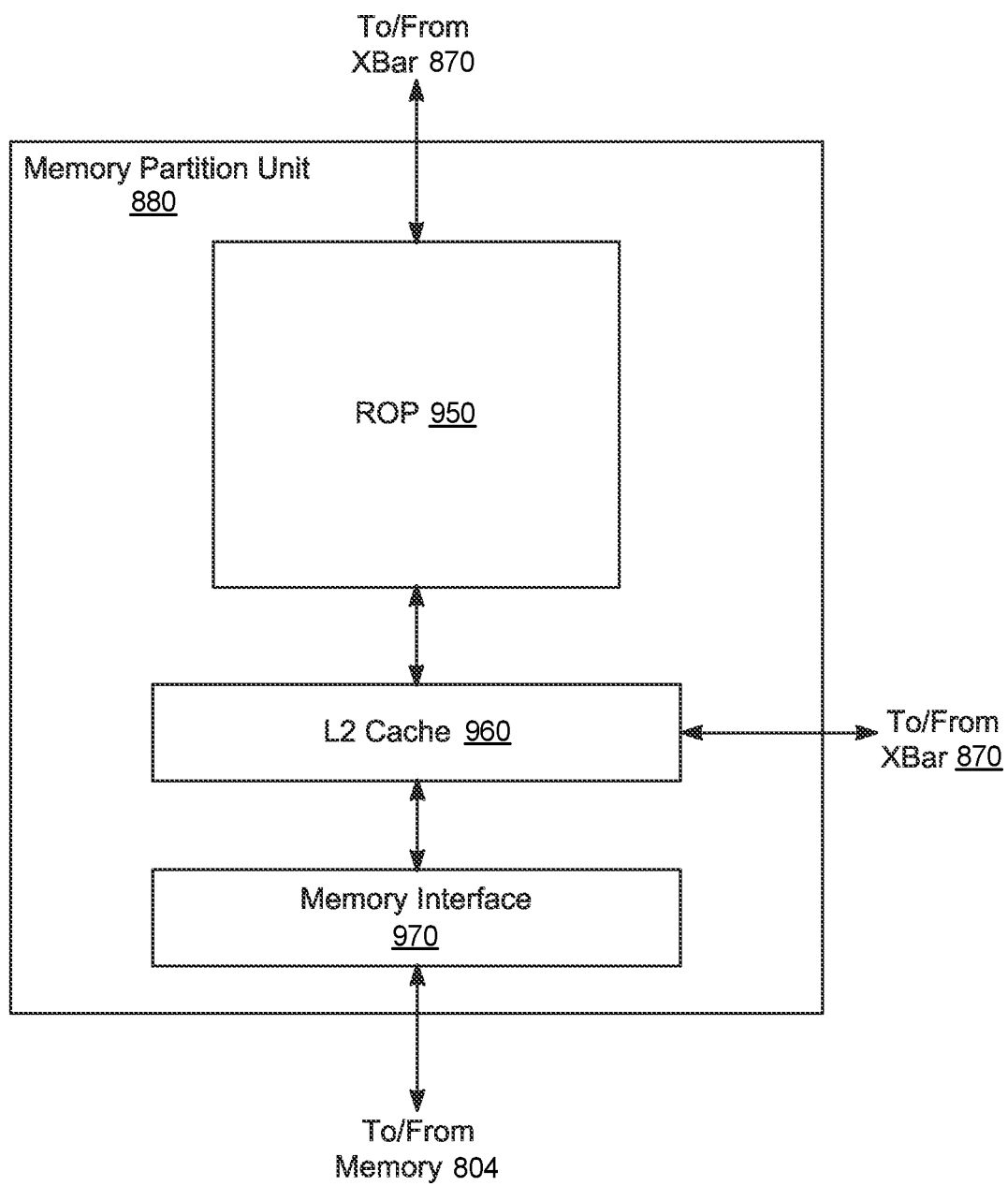
FIG. 9B illustrates an example memory partition unit of the parallel processing unit of FIG. 8.

The PROP unit 915 is configured to route data generated by the raster engine 925 and the DPCs 920 to a Raster Operations (ROP) unit, described in more detail in conjunction with FIG. 9B. The PROP unit 915 may also be configured to perform optimizations for color blending, organize pixel data, perform address translations, and the like.

Each DPC 920 included in the GPC 850 includes an M-Pipe Controller (MPC) 930, a primitive engine 935, and one or more SMs 940. The MPC 930 controls the operation of the DPC 920, routing packets received from the pipeline manager 910 to the appropriate units in the DPC 920. For example, packets associated with a vertex may be routed to the primitive engine 935, which is configured to fetch vertex attributes associated with the vertex from the memory 804. In contrast, packets associated with a shader program may be transmitted to the SM 940.

The SM 940 comprises a programmable streaming processor that is configured to process tasks represented by a number of threads. Each SM 940 is multi-threaded and configured to execute a plurality of threads (e.g., 32 threads) from a particular group of threads concurrently. In an embodiment, the SM 940 implements a SIMT (Single-Instruction, Multiple-Thread) architecture where each thread in a group of threads (e.g., a warp) is configured to process a different set of data based on the same set of instructions. All threads in the group of threads execute the same instructions. In another embodiment, the SM 940 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 940 is described in more detail below in conjunction with FIG. 10A.

The MMU 990 provides an interface between the GPC 850 and the partition unit 880. The MMU 990 may provide translation of virtual addresses into physical addresses, memory protection, and arbitration of memory requests. In an embodiment, the MMU 990 provides one or more translation lookaside buffers (TLBs) for performing translation of virtual addresses into physical addresses in the memory 804.

FIG. 9B illustrates a memory partition unit 880 of the PPU 800 of FIG. 8 in accordance with an embodiment. As shown in FIG. 9B, the memory partition unit 880 includes a Raster Operations (ROP) unit 950, a level two (L2) cache 960, and a memory interface 970. The memory interface 970 is coupled to the memory 804. Memory interface 970 may implement 32, 64, 128, 1024-bit data buses, or the like, for high-speed data transfer. In an embodiment, the PPU 800 incorporates U memory interfaces 970, one memory interface 970 per pair of partition units 880, where each pair of partition units 880 is connected to a corresponding memory device 804. For example, PPU 800 may be connected to up to Y memory devices 804, such as high bandwidth memory stacks or graphics double-data-rate, version 5, synchronous dynamic random access memory, or other types of persistent storage.

In an embodiment, the memory interface 970 implements an HBM2 memory interface and Y equals half U. In an embodiment, the HBM2 memory stacks are located on the same physical package as the PPU 800, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 824 bits.

In an embodiment, the memory 804 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 800 process very large datasets and/or run applications for extended periods.

In an embodiment, the PPU 800 implements a multi-level memory hierarchy. In an embodiment, the memory partition unit 880 supports a unified memory to provide a single unified virtual address space for CPU and PPU 300 memory, enabling data sharing between virtual memory systems. In an embodiment the frequency of accesses by a PPU 800 to memory located on other processors is traced to ensure that memory pages are moved to the physical memory of the PPU 800 that is accessing the pages more frequently. In an embodiment, the NVLink 810 supports address translation services allowing the PPU 800 to directly access a CPU's page tables and providing full access to CPU memory by the PPU 800.

In an embodiment, copy engines transfer data between multiple PPUs 800 or between PPUs 800 and CPUs. The copy engines can generate page faults for addresses that are not mapped into the page tables. The memory partition unit 880 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 804 or other system memory may be fetched by the memory partition unit 880 and stored in the L2 cache 960, which is located on-chip and is shared between the various GPCs 850. As shown, each memory partition unit 880 includes a portion of the L2 cache 960 associated with a corresponding memory device 804. Lower level caches may then be implemented in various units within the GPCs 850. For example, each of the SMs 940 may implement a level one (L1) cache. The L1 cache is private memory that is dedicated to a particular SM 940. Data from the L2 cache 960 may be fetched and stored in each of the L1 caches for processing in the functional units of the SMs 940. The L2 cache 960 is coupled to the memory interface 970 and the XBar 870.

The ROP unit 950 performs graphics raster operations related to pixel color, such as color compression, pixel blending, and the like. The ROP unit 450 also implements depth testing in conjunction with the raster engine 925, receiving a depth for a sample location associated with a pixel fragment from the culling engine of the raster engine 925. The depth is tested against a corresponding depth in a depth buffer for a sample location associated with the fragment. If the fragment passes the depth test for the sample location, then the ROP unit 950 updates the depth buffer and transmits a result of the depth test to the raster engine 925. It will be appreciated that the number of partition units 880 may be different than the number of GPCs 850 and, therefore, each ROP unit 950 may be coupled to each of the GPCs 850. The ROP unit 950 tracks packets received from the different GPCs 850 and determines which GPC 850 that a result generated by the ROP unit 950 is routed to through the Xbar 870. Although the ROP unit 950 is included within the memory partition unit 880 in FIG. 9B, in other embodiment, the ROP unit 950 may be outside of the memory partition unit 880. For example, the ROP unit 950 may reside in the GPC 850 or another unit.

Figure 10A:
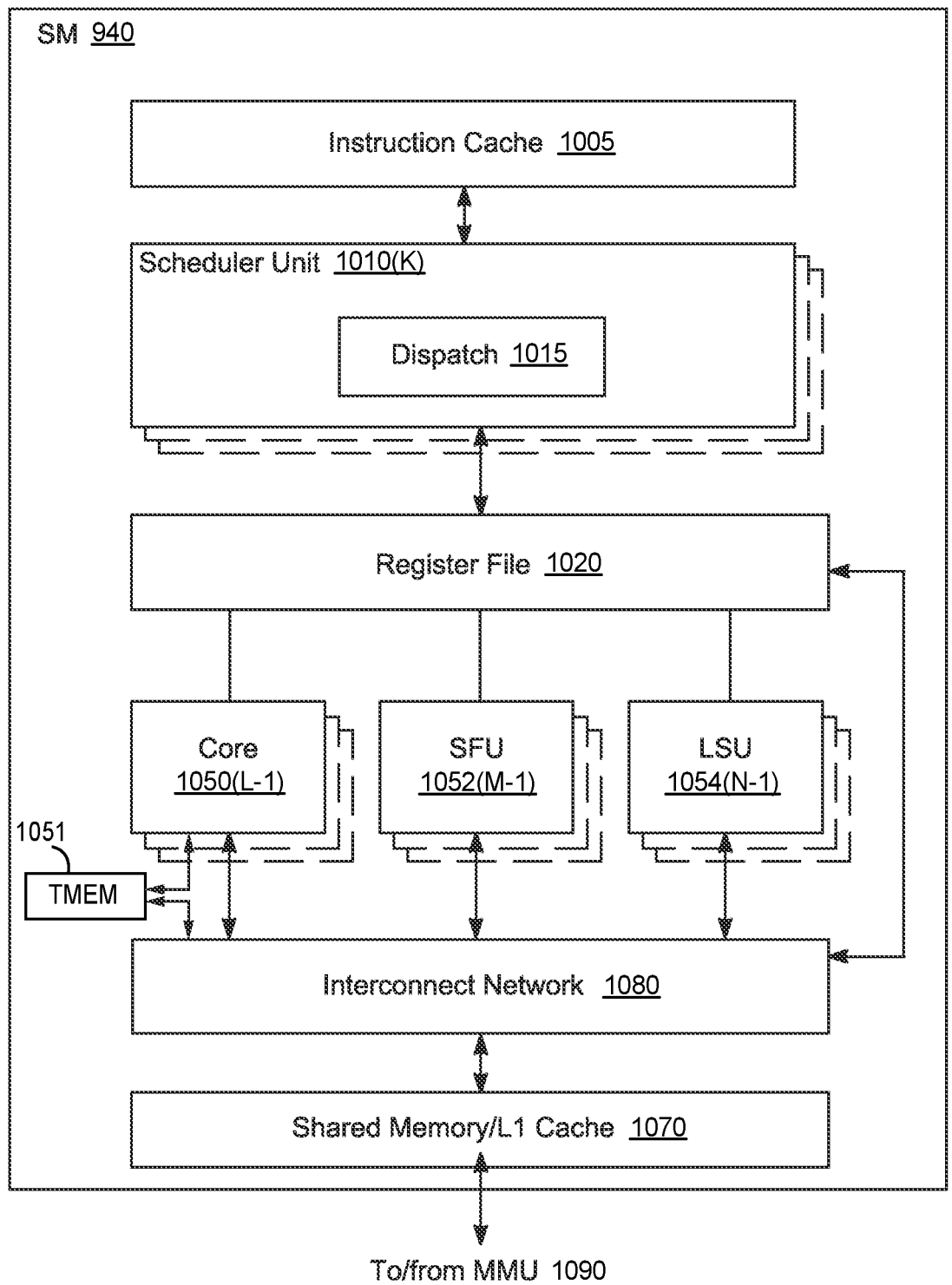
FIG. 10A illustrates an example streaming multiprocessor (SM) of FIG. 9A with MMA state machine circuitry, according to some embodiments.
Figure 10B:
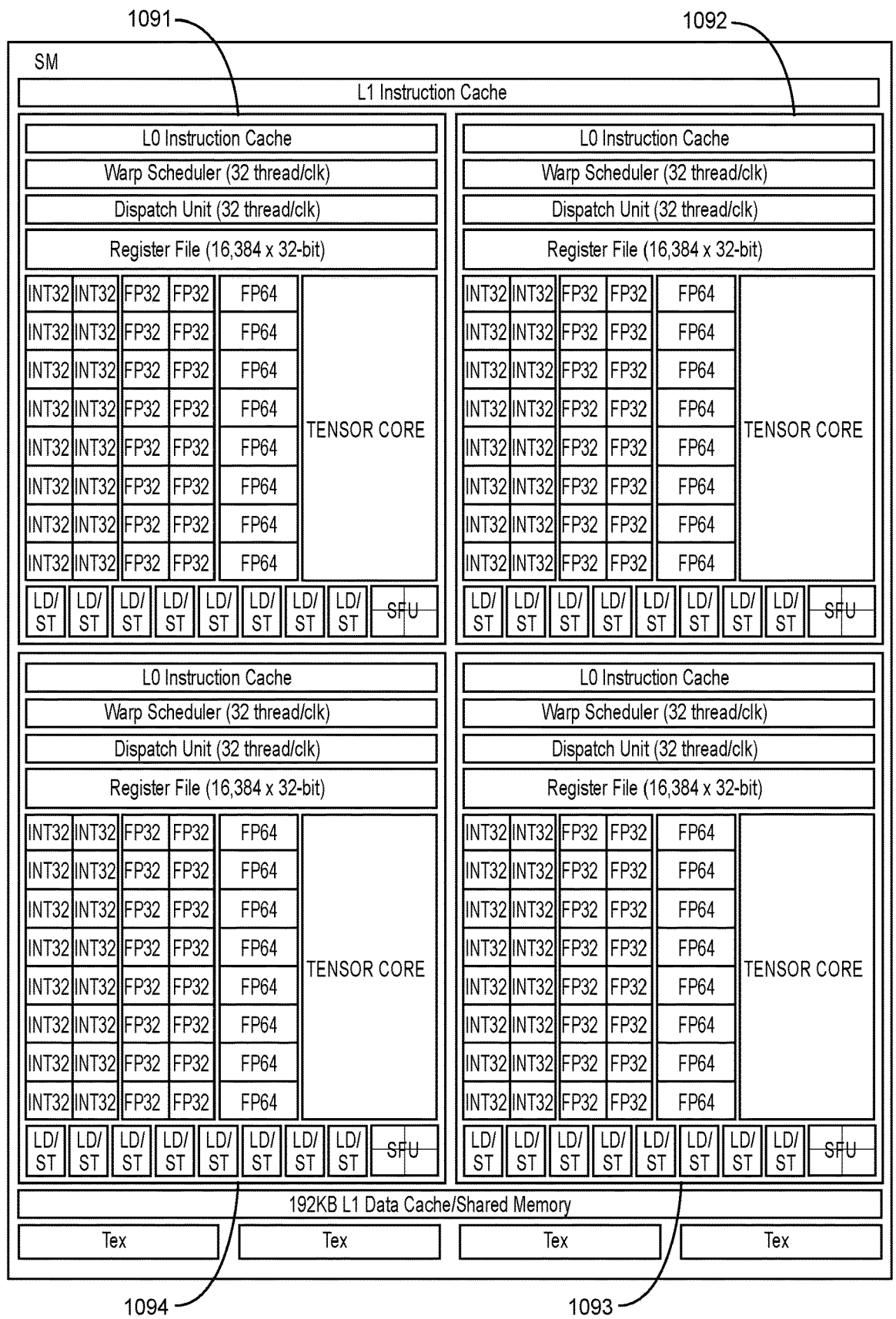
FIG. 10B conceptually illustrates four subpartitions implemented in an SM such as the SM shown in FIG. 10A, according to some embodiments.

FIG. 10A illustrates the streaming multiprocessor 940 of FIG. 9A, in accordance with an embodiment. FIG. 10B conceptually illustrates four subpartitions 1091-1094 implemented in an SM such as the SM shown in FIG. 10A, according to some embodiments. As shown in FIG. 10A, the SM 940 includes an instruction cache 1005, one or more scheduler units 1010, a register file 1020, one or more processing cores 1050, one or more special function units (SFUs) 1052, one or more load/store units (LSUs) 1054, an interconnect network 1080, a SMEM/L1 cache 1070.

As described above, the work distribution unit 825 dispatches tasks for execution on the GPCs 850 of the PPU 800. The tasks are allocated to a particular DPC 920 within a GPC 850 and, if the task is associated with a shader program, the task may be allocated to an SM 940. The scheduler unit 1010 receives the tasks from the work distribution unit 825 and manages instruction scheduling for one or more thread blocks assigned to the SM 940. The scheduler unit 1010 schedules thread blocks for execution as warps of parallel threads, where each thread block consists of at least one warp. In an embodiment, each warp comprises 32 threads. The scheduler unit 1010 may manage a plurality of different thread blocks, allocating the different thread blocks to different warps and then dispatching instructions from the plurality of different cooperative groups to the various functional units (e.g., cores 1050, SFUs 1052, and LSUs 1054) during each clock cycle.

Cooperative Group Arrays (CGAs) provide a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Group Arrays enable programmers to define groups of threads explicitly at sub-block (e.g., as small as a single thread) and multi-block granularities, and to perform collective operations on the threads such as synchronization in a cooperative group. The programming model supports clean composition across software boundaries, so that libraries and utility functions can synchronize safely within their local context without having to make assumptions about convergence. Cooperative Group Array primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

A dispatch unit 1015 is configured to transmit instructions to one or more of the functional units. In the embodiment, the scheduler unit 1010 includes two dispatch units 1015 that enable two different instructions from the same warp to be dispatched during each clock cycle. In alternative embodiments, each scheduler unit 1010 may include a single dispatch unit 1015 or additional dispatch units 1015.

Each SM 940 includes a register file 1020 that provides a set of registers for the functional units of the SM 940. In an embodiment, the register file 1020 is divided between each of the functional units such that each functional unit is allocated a dedicated portion of the register file 1020. In another embodiment, the register file 1020 is divided between the different warps being executed by the SM 940. The register file 1020 provides temporary storage for operands connected to the data paths of the functional units.

Each SM 940 comprises multiple processing cores 1050. In an embodiment, the SM 940 includes a large number (e.g., 128, etc.) of distinct processing cores 1050. Each core 1050 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic.

Tensor cores are configured to perform matrix operations, and, in an embodiment, one or more tensor cores are included in the cores 1050. In particular, the tensor cores are configured to perform deep learning matrix arithmetic, such as convolution operations for neural network training and inferencing.

In some embodiments, transposition hardware is included in the processing cores 1050 or another functional unit (e.g., SFUs 1052 or LSUs 1054) and is configured to generate matrix data stored by diagonals and/or generate the original matrix and/or transposed matrix from the matrix data stored by diagonals. The transposition hardware may be provided inside of the SMEM 1070 to register file 1020 load path of the SM 940.

Each SM 940 also comprises multiple SFUs 1052 that perform special functions (e.g., attribute evaluation, reciprocal square root, and the like). In an embodiment, the SFUs 1052 may include a tree traversal unit (e.g., TTU 943) configured to traverse a hierarchical tree data structure. In an embodiment, the SFUs 1052 may include texture unit (e.g., Texture Unit 942) configured to perform texture map filtering operations. In an embodiment, the texture units are configured to load texture maps (e.g., a 2D array of texels) from the memory 804 and sample the texture maps to produce sampled texture values for use in shader programs executed by the SM 940. In an embodiment, the texture maps are stored in the SMEM/L1 cache 970. The texture units implement texture operations such as filtering operations using mip-maps (e.g., texture maps of varying levels of detail). In an embodiment, each SM 940 includes two texture units.

Each SM 940 also comprises multiple LSUs 1054 that implement load and store operations between the SMEM/L1 cache 1070 and the register file 1020. Each SM 940 includes an interconnect network 1080 that connects each of the functional units to the register file 1020 and the LSU 1054 to the register file 1020, SMEM/L1 cache 1070. In an embodiment, the interconnect network 1080 is a crossbar that can be configured to connect any of the functional units to any of the registers in the register file 1020 and connect the LSUs 1054 to the register file 1020 and memory locations in SMEM/L1 cache 1070.

The SMEM/L1 cache 1070 is an array of on-chip memory that allows for data storage and communication between the SM 940 and the primitive engine 935 and between threads in the SM 940. In an embodiment, the SMEM/L1 cache 1070 comprises 128 KB of storage capacity and is in the path from the SM 940 to the partition unit 880. The SMEM/L1 cache 1070 can be used to cache reads and writes. One or more of the SMEM/L1 cache 1070, L2 cache 960, and memory 804 are backing stores.

Combining data cache and SMEM functionality into a single memory block provides the best overall performance for both types of memory accesses. The capacity is usable as a cache by programs that do not use SMEM. For example, if SMEM is configured to use half of the capacity, texture and load/store operations can use the remaining capacity. Integration within the SMEM/L1 cache 1070 enables the SMEM/L1 cache 1070 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local SMEM enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 9A, are bypassed, creating a much simpler programming model. In the general purpose parallel computation configuration, the work distribution unit 825 assigns and distributes blocks of threads directly to the DPCs 920. The threads in a block execute the same program, using a unique thread ID in the calculation to ensure each thread generates unique results, using the SM 940 to execute the program and perform calculations, SMEM/L1 cache 1070 to communicate between threads, and the LSU 1054 to read and write global memory through the SMEM/L1 cache 1070 and the memory partition unit 880. When configured for general purpose parallel computation, the SM 940 can also write commands that the scheduler unit 820 can use to launch new work on the DPCs 920.

The PPU 800 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 800 is embodied on a single semiconductor substrate. In another embodiment, the PPU 800 is included in a system-on-a-chip (SoC) along with one or more other devices such as additional PPUs 800, the memory 804, a reduced instruction set computer (RISC) CPU, a memory management unit (MMU), a digital-to-analog converter (DAC), and the like.

In an embodiment, the PPU 800 may be included on a graphics card that includes one or more memory devices 804. The graphics card may be configured to interface with a PCIe slot on a motherboard of a desktop computer. In yet another embodiment, the PPU 800 may be an integrated graphics processing unit (iGPU) or parallel processor included in the chipset of the motherboard. In some embodiments, two or more PPUs 800 are integated in a single package to form a multi-dielet PPU (e.g., multi-dielet GPU described in this application).

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 11A:
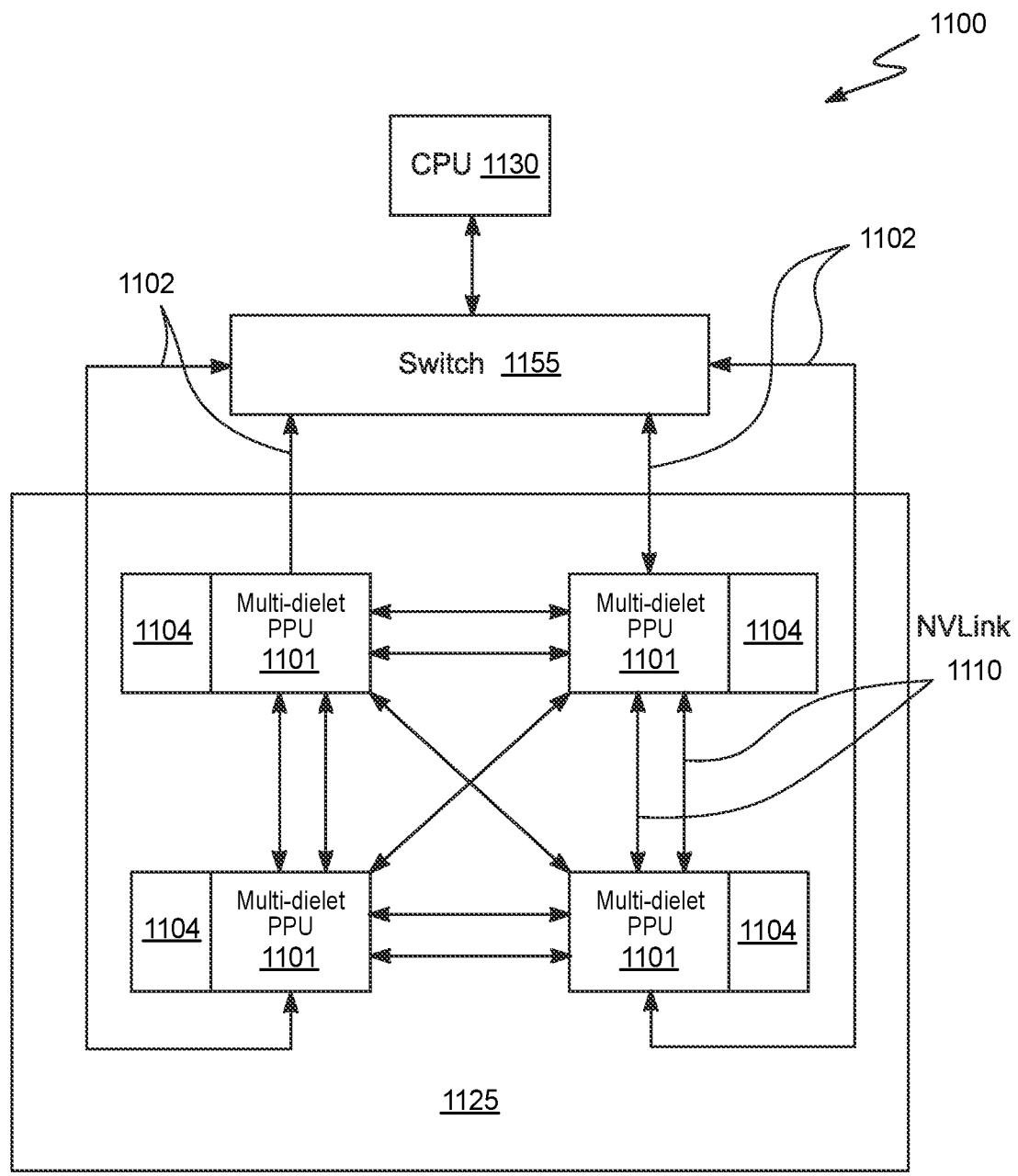
FIG. 11A is an example conceptual diagram of a processing system implemented using the parallel processing unit (PPU) of FIG. 8.

FIG. 11A is a conceptual diagram of a processing system 1100 implemented using multi-dielet PPUs 1101 that include two or more of the PPU 800 of FIG. 8, in accordance with an embodiment. The processing system 1100 includes a CPU 1130, switch 1155, and multiple multi-dielet PPUs 1101 each and respective memories 1104. The NVLink 1110 provides high-speed communication links between each of the multi-dielet PPUs 1101. Although a particular number of NVLink 1110 and interconnect 1102 connections are illustrated in FIG. 11A, the number of connections to each multi-dielet PPU 1101 and the CPU 1130 may vary. The switch 1155 interfaces between the interconnect 1102 and the CPU 1130. The multi-dielet PPUs 1101, memories 1104, and NVLinks 1110 may be situated on a single semiconductor platform to form a parallel processing module 1125. In an embodiment, the switch 1155 supports two or more protocols to interface between various different connections and/or links.

In another embodiment (not shown), the NVLink 1110 provides one or more high-speed communication links between each of the multi-dielet PPUs 1101 and the CPU 1130 and the switch 1155 interfaces between the interconnect 1102 and each of the multi-dielet PPUs 1101. The multi-dielet PPUs 1101, memories 1104, and interconnect 1102 may be situated on a single semiconductor platform to form a parallel processing module 1125. In yet another embodiment (not shown), the interconnect 1102 provides one or more communication links between each of the multi-dielet PPUs 1101 and the CPU 1130 and the switch 1155 interfaces between each of the multi-dielet PPUs 1101 using the NVLink 1110 to provide one or more high-speed communication links between the multi-dielet PPUs 1101. In another embodiment (not shown), the NVLink 1110 provides one or more high-speed communication links between the PPUs 1101 and the CPU 1130 through the switch 1155. In yet another embodiment (not shown), the interconnect 1102 provides one or more communication links between each of the multi-dielet PPUs 1101 directly. One or more of the NVLink 1110 high-speed communication links may be implemented as a physical NVLink interconnect or either an on-chip or on-die interconnect using the same protocol as the NVLink 1110.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1125 may be implemented as a circuit board substrate and each of the multi-dielet PPUs 1101 and/or memories 1104 may be packaged devices. In an embodiment, the CPU 1130, switch 1155, and the parallel processing module 1125 are situated on a single semiconductor platform.

In an embodiment, the NVLink 1110 allows direct load/store/atomic access from the CPU 1130 to each multi-dielet PPU's 1101 memory 1104. In an embodiment, the NVLink 1110 supports coherency operations, allowing data read from the memories 1104 to be stored in the cache hierarchy of the CPU 1130, reducing cache access latency for the CPU 1130. In an embodiment, the NVLink 1110 includes support for Address Translation Services (ATS), allowing the multi-dielet PPU 1101 to directly access page tables within the CPU 1130. One or more of the NVLinks 1110 may also be configured to operate in a low-power mode.

Figure 11B:
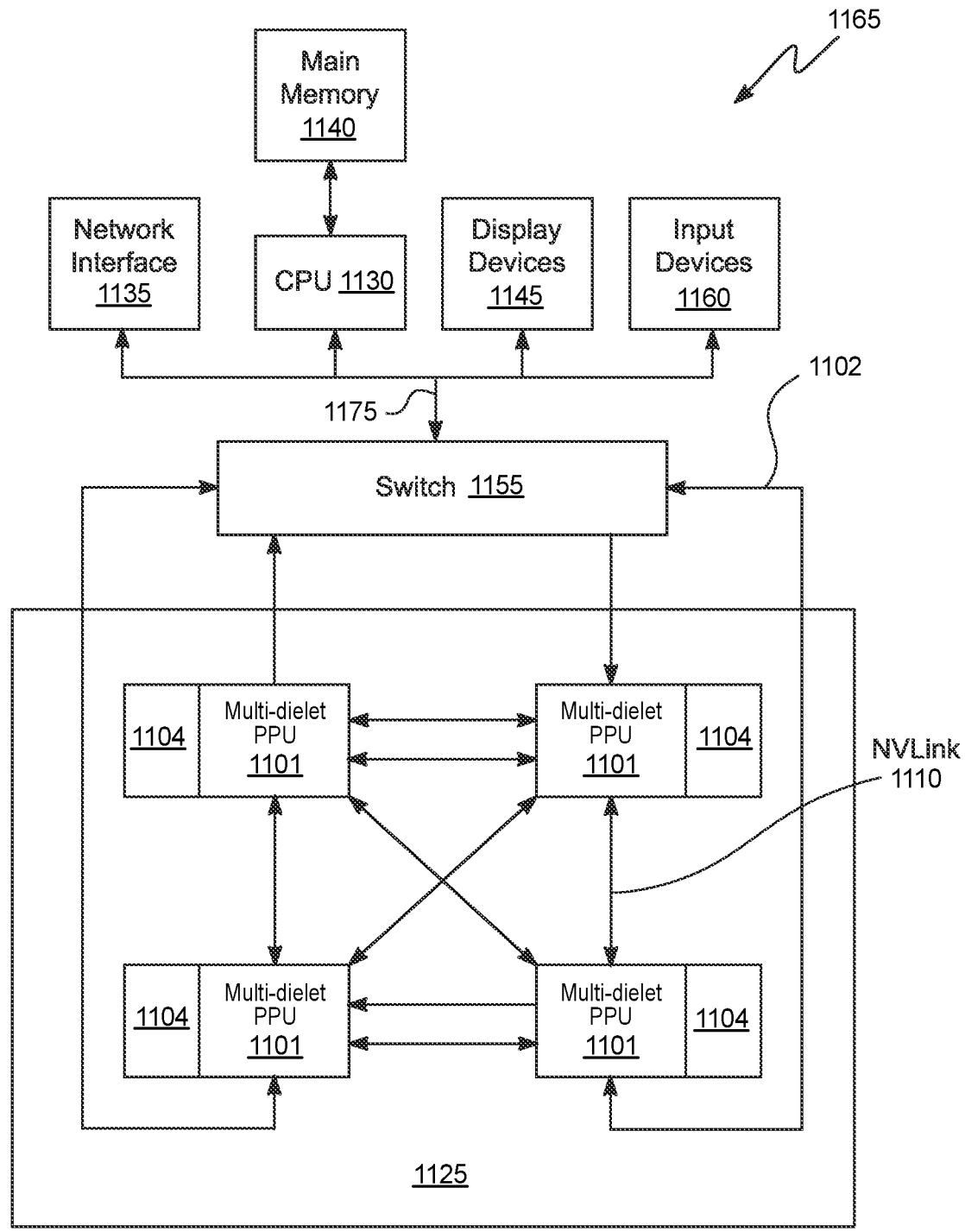
FIG. 11B is a block diagram of an exemplary system in which the various architecture and/or functionality of the various previous embodiments may be implemented.

FIG. 11B illustrates an exemplary system 1165 in which the various architecture and/or functionality of the various previous embodiments may be implemented. The exemplary system 1165 may be configured to implement the methods disclosed in this application.

As shown, a system 1165 is provided including at least one central processing unit 1130 that is connected to a communication bus 1175. The communication bus 1175 may be implemented using any suitable protocol, such as PCI (Peripheral Component Interconnect), PCI-Express, AGP (Accelerated Graphics Port), HyperTransport, or any other bus or point-to-point communication protocol(s). The system 1165 also includes a main memory 1140. Control logic (software) and data are stored in the main memory 1140 which may take the form of random access memory (RAM).

The system 1165 also includes input devices 1160, the parallel processing system 1125, and display devices 1145, e.g. a conventional CRT (cathode ray tube), LCD (liquid crystal display), LED (light emitting diode), plasma display or the like. User input may be received from the input devices 1160, e.g., keyboard, mouse, touchpad, microphone, and the like. Each of the foregoing modules and/or devices may even be situated on a single semiconductor platform to form the system 1165. Alternately, the various modules may also be situated separately or in various combinations of semiconductor platforms per the desires of the user.

Further, the system 1165 may be coupled to a network (e.g., a telecommunications network, local area network (LAN), wireless network, wide area network (WAN) such as the Internet, peer-to-peer network, cable network, or the like) through a network interface 1135 for communication purposes.

The system 1165 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1140 and/or the secondary storage. Such computer programs, when executed, enable the system 1165 to perform various functions. The memory 1140, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1165 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the multi-dielet PPU 1101. The API provides an abstraction for a programmer that lets a programmer utilize specialized graphics hardware, such as the multi-dielet PPU 1101, to generate the graphical data without requiring the programmer to utilize the specific instruction set for the multi-dielet PPU 1101. The application may include an API call that is routed to the device driver for the multi-dielet PPU 1101. The device driver interprets the API call and performs various operations to respond to the API call. In some instances, the device driver may perform operations by executing instructions on the CPU. In other instances, the device driver may perform operations, at least in part, by launching operations on the multi-dielet PPU 1101 utilizing an input/output interface between the CPU and the multi-dielet PPU 1101. In an embodiment, the device driver is configured to implement the graphics processing pipeline utilizing the hardware of the multi-dielet PPU 1101.

Various programs may be executed within the multi-dielet PPU 1101 in order to implement the various stages of the processing for the application program. For example, the device driver may launch a kernel on the multi-dielet PPU 1101 to perform one stage of processing on one SM 940 (or multiple SMs 940). The device driver (or the initial kernel executed by the multi-dielet PPU 1101) may also launch other kernels on the multi-dielet PPU 1101 to perform other stages of the processing. If the application program processing includes a graphics processing pipeline, then some of the stages of the graphics processing pipeline may be implemented on fixed unit hardware such as a rasterizer or a data assembler implemented within the multi-dielet PPU 1101. It will be appreciated that results from one kernel may be processed by one or more intervening fixed function hardware units before being processed by a subsequent kernel on an SM 940.

The techniques disclosed herein may be incorporated in any processor that may be used for processing a neural network such as, for example, a central processing unit (CPU), a graphics processing unit (GPU), an intelligence processing unit (IPU), neural processing unit (NPU), tensor processing unit (TPU), neural network processor (NNP), a data processing unit (DPU), a vision processing unit (VPU), an application specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or to alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile device, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating from one spoken language to another, identifying and negating sounds in audio, detecting anomalies or defects during production of goods and services, surveillance of living and/or non-living things, medical diagnosis, decision making, and the like.

As an example, a processor incorporating the techniques disclosed herein can be employed to implement neural networks such as large language models (LLMs) to generate content (e.g., images, video, text, essays, audio, and the like), respond to user queries, solve problems in mathematical and other domains, and the like.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A multi-dielet processing system comprising:
a plurality of processors comprising at least a first processor on a first dielet and at least a second processor on a second dielet different from the first dielet, wherein the plurality of processors each comprises a plurality of hardware engines; and
hardware engine remapping circuitry configured to map between respective local dielet-based engine identifiers of the pluralities of hardware engines and corresponding respective engine identifiers.

2. The multi-dielet processing system according to claim 1, wherein each of the respective engine identifiers indicates a corresponding hardware engine irrespective of which dielet the corresponding hardware engine is located on.

3. The multi-dielet processing system according to claim 1, wherein the hardware engine remapping circuitry is configured to perform the mapping for a page table bind request, an address translation request, a security check request, or a fault handling request, or a corresponding response thereto.

4. The multi-dielet processing system according to claim 3, wherein the source of the request is software executing on a processor external to the dielets.

5. The multi-dielet processing system according to claim 3, wherein the source of the request or the corresponding response is a task executing on one of the plurality of processors.

6. The multi-dielet processing system according to claim 3, wherein the request includes a flag indicating to convert a local engine identifier to a unique engine identifier, wherein the local engine identifier is a dielet-relative engine ID and the unique engine identifier is a globally unique engine ID equivalent of the dielet-relative engine ID.

7. The multi-dielet processing system according to claim 6, wherein the hardware engine remapping circuitry is further configured to calculate, for each of the dielets, an offset based on a dielet-identifying fuse signal and use the calculated offset in the mapping.

8. The multi-dielet processing system according to claim 1, wherein the hardware engine remapping circuitry is configured to determine a globally unique dielet identifier for each dielet based on a dielet-identifying fuse signal.

9. The multi-dielet processing system according to claim 1, wherein the hardware engine remapping circuitry comprises a plurality of dielet-level remapping circuits, and each dielet-level remapping circuit is configured to operate independently of others of the dielet-level remapping circuits.

10. The multi-dielet processing system according to claim 9, wherein each dielet-level remapping circuit is configured to apply an offset to hardware engine identifiers in received messages, wherein the offset is determined based on a dielet-identifying fuse signal.

11. The multi-dielet processing system according to claim 10, wherein each dielet-level remapping circuit is further configured to, based on the applying, determine whether to forward the received messages to another of the dielet-level remapping circuits located on different dielets.

12. The multi-dielet processing system according to claim 11, wherein each dielet-level remapping circuit is configured to forward the received messages to others of the dielet-level remapping circuits located on different dielets via a dedicated communication link between frame buffer hubs of each of the dielets.

13. The multi-dielet processing system according to claim 10, wherein each dielet-level remapping circuit is further configured to, based on the applying, determine whether to forward the received messages to at least one local hardware engine.

14. The multi-dielet processing system according to claim 1, further comprising
   a respective memory barrier handling circuit arranged on each dielet of the plurality of dielets, wherein each memory barrier handling circuit is configured to determine a state of a memory barrier based on acknowledgments received from one or more local hardware engines on the same dielet as the memory barrier handling circuit and one or more acknowledgments received from others of the plurality of dielets.

15. The multi-dielet processing system according to claim 14, wherein a set of the ack to monitor is determined based on a scope of the memory barrier.

16. The multi-dielet processing system according to claim 15, wherein the respective memory barrier handling circuit comprises at least a first state machine configured for locally originated input/output flush requests and a second state machine configured for remote originated input/output flush requests.

17. The multi-dielet processing system according to claim 1, wherein the plurality of processors on respectively different dielets are in a single package, wherein the package is configured to be connected to a central processing unit (CPU) in a computer.

18. The multi-dielet processing system according to claim 1, wherein the hardware engine remapping circuitry comprises a plurality of dielet-level remapping circuits, and each dielet of the plurality of dielets includes a respective one of the dielet-level remapping circuits.

19. The multi-dielet processing system according to claim 1, wherein each of the plurality of processors is a graphics processing unit (GPU).

20. A method performed by a hardware engine remapping circuitry in a multi-dielet processing system, wherein the multi-dielet processing system comprises a plurality of processors on respectively different dielets each comprising a plurality of hardware engines, comprising:
   determining an offset, wherein the offset is different for each of the dielets; and
   in response to a received message, based on the determined offset for a particular dielet, mapping between respective a local engine identifier of a hardware engine and a corresponding unique engine identifier.

* * * * *